United States Patent
Chung et al.

(10) Patent No.: US 8,289,472 B2
(45) Date of Patent: Oct. 16, 2012

(54) LIQUID CRYSTAL DISPLAY MODULE AND DRIVING APPARATUS THEREOF

(75) Inventors: In Jae Chung, Kyounggi-do (KR); Gee Sung Chae, Incheon (KR)

(73) Assignee: LG Display Co., Ltd., Seoul (KR)

( * ) Notice: Subject to any disclaimer, the term of this patent is extended or adjusted under 35 U.S.C. 154(b) by 159 days.

(21) Appl. No.: 10/865,752

(22) Filed: Jun. 14, 2004

(65) Prior Publication Data

US 2004/0264212 A1 Dec. 30, 2004

(30) Foreign Application Priority Data

Jun. 30, 2003 (KR) .................. 10-2003-0043808

(51) Int. Cl.
*G02F 1/13* (2006.01)
(52) U.S. Cl. ........................ 349/61; 349/64; 349/65
(58) Field of Classification Search ............. 349/61–71; 362/561, 612; 345/102
See application file for complete search history.

(56) References Cited

U.S. PATENT DOCUMENTS

| | | | |
|---|---|---|---|
| 5,143,433 A * | 9/1992 | Farrell | 362/29 |
| 6,204,899 B1 * | 3/2001 | Hall | 349/65 |
| 6,666,567 B1 * | 12/2003 | Feldman et al. | 362/237 |
| 6,975,369 B1 * | 12/2005 | Burkholder | 349/61 |
| 7,284,890 B2 * | 10/2007 | Ahn et al. | 362/612 |
| 2002/0171617 A1 * | 11/2002 | Fuller | 345/102 |
| 2003/0081156 A1 * | 5/2003 | Creemers et al. | 349/106 |
| 2004/0027672 A1 * | 2/2004 | Bourdelais et al. | 359/586 |
| 2004/0061810 A1 * | 4/2004 | Lowery et al. | 349/62 |
| 2004/0090569 A1 * | 5/2004 | Yu et al. | 349/69 |
| 2006/0028844 A1 * | 2/2006 | Parker | 362/613 |

FOREIGN PATENT DOCUMENTS

| | | | |
|---|---|---|---|
| JP | 2002-350846 | | 12/2002 |
| JP | 2003-140110 | | 5/2003 |
| JP | 2003140110 A | * | 5/2003 |
| KR | 10-1998-0060832 | | 10/1998 |
| KR | 10-2002-0039963 | | 5/2002 |

* cited by examiner

Primary Examiner — Thanh-Nhan P Nguyen
(74) Attorney, Agent, or Firm — McKenna Long & Aldridge, LLP

(57) ABSTRACT

A liquid crystal display module includes a liquid crystal display panel, a plurality of lamps for irradiating a first light onto the liquid crystal display panel, and a back light unit including a plurality of light emitting diode arrays, each of the light emitting diode arrays having a plurality of light emitting diodes arranged between the lamps to irradiate a second light onto the liquid crystal display panel.

23 Claims, 32 Drawing Sheets

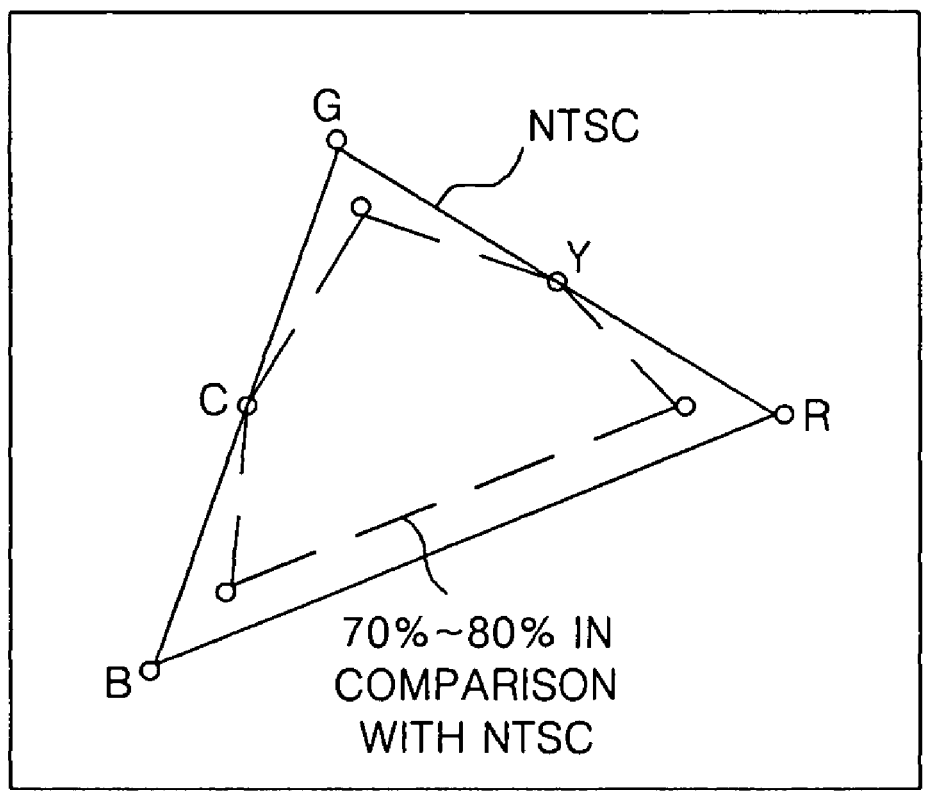

< IMPROVING C/F PURITY >

○ : WHITE LED

- ● YELLOW LED
- ⊗ CYAN LED
- ⊘ MAGENTA LED
- ○ WHITE LED

- ● YELLOW LED
- ⊘ MAGENTA LED

LIQUID CRYSTAL DISPLAY MODULE AND DRIVING APPARATUS THEREOF

The present invention claims the benefit of Korean Patent Application No. P2003-43808 filed in Korea on Jun. 30, 2003, which is hereby incorporated by reference.

BACKGROUND OF THE INVENTION

1. Field of the Invention

The present invention relates to a display module and a driving apparatus thereof, and more particularly, to a liquid crystal display module and a driving apparatus thereof.

2. Description of the Related Art

In general, liquid crystal display (LCD) devices are commonly used in display devices because of their light weight, thin profile, and low power consumption. For example, the LCD device are commonly used in office automation devices and audio/video devices. The LCD device displays images by adjusting light transmissivity according to image signals supplied to a plurality of control switches arranged in a matrix configuration.

Generally, LCD devices include an LCD module and a driving circuitry for driving the LCD module. The LCD module consists of an LCD panel having a plurality of liquid crystal cells arranged in a matrix configuration between two glass substrates, and a backlight unit for irradiating light onto the LCD panel. The LCD panel and the backlight unit are engaged with each other as an integral device so as to prevent light loss, and to prevent damage caused by external impact. Accordingly, there is provided a case for the LCD panel enclosing the back light unit including edges of the LCD panel.

There are two types of the back light units used with LCD panels: a direct-below-type; and an edge-type. The edge-type back light unit includes a fluorescent lamp installed at an exterior of a flat plate, wherein light produced by the fluorescent lamp is incident along an entire surface of the LCD panel through a transparent light guide plate. The direct-below-type back light unit has a light source arranged at a rear surface of the LCD panel, and directly radiates light along an entire surface of the LCD panel. As compared with the edge-type back light unit, the direct-below-type back light unit has an advantage that a plurality of light sources can be used, thereby improving brightness and increasing a light-emitting surface of the direct-below-type back light unit.

FIG. 1 is a perspective assembly view of an LCD module according to the related art, and FIG. 2 is a cross sectional view along I-I' of FIG. 1 according to the related art. In FIGS. 1 and 2, an LCD module 1 includes a main support 14, a backlight unit 18, an LCD panel 6 stacked along an interior of the main support 14, and a case top 2 for enclosing edges of the LCD panel 6 and a side surface of the main support 14. Although not shown, an upper polarizing sheet is attached onto the upper substrate 5 of the LCD panel 6, and a lower polarizing sheet is attached onto a rear side of the lower substrate 3 of the LCD panel 6.

The LCD panel 6 includes an upper substrate 5 and a lower substrate 3, and a liquid crystal material injected between-the upper substrate 5 and the lower substrate 3. Although not shown, the LCD panel 6 is provided with a spacer for maintaining a uniform gap between the upper substrate 5 and the lower substrate 3.

The upper substrate 5 of the LCD panel 6 is provided with a color filter, a common electrode, and a black matrix (not shown), and the lower substrate 3 includes a plurality of signal lines (not shown), such as data lines and gate lines, and a thin film transistor (TFT) is formed at each intersection of the data lines and the gate lines. The TFT switches data signals to be transmitted along the data line to the liquid crystal cell in response to a scanning pulse (i.e., a gate pulse) transmitted along the gate line. In addition, a pixel electrode is formed at each pixel area defined by the intersection of the data line and the gate line.

One side of the lower substrate 3 is provided with a pad area connected-to each of the data line and the gate line. Although not shown, a tape carrier package (TCP), which includes a driver integrated circuit (IC) mounted thereon for supplying driving signals to the TFTs, is attached onto the pad area. The TCP supplies data signals from the driver IC to the data lines. In addition, the TCP supplies scanning signals to the gate lines.

In FIG. 1, the main support 14 is formed of a molded material, and its inner side wall surface is molded to have a step coverage face and a securing part, wherein the back light unit 18 and the LCD panel 6 are disposed on the step coverage face. The back light unit 18 is a direct below-type unit that irradiates light onto the LCD panel 6, wherein the LCD panel 6 and the back light unit 18 are stacked inside of the main support 14.

FIG. 3 is a perspective view of a back light unit of the LCD module of FIG. 1 according to the related art. In FIG. 3, the back light unit is a direct below-type back light unit and includes a plurality of lamps 20 irradiating light onto the LCD panel 6, a plurality of lamp holders 22 upon which the plurality of the lamps 20 are mounted, a diffuser 10 (in FIG. 1) diffusing incident light received from the plurality of the lamps 20 and irradiate the light onto the LCD panel 6, a lamp housing 18 arranged at a rear surface of the plurality of the lamps 20, and a plurality of optical sheets 8 stacked on the diffuser 10. The lamp housing 18 includes a reflection sheet 12 and a bottom cover 16 arranged on the rear surface of the reflection sheet 12.

Each of the plurality of lamps 20 is a cold cathode fluorescent lamp, wherein the lamps 20 include a glass tube, inert gases contained within the glass tube, and a cathode and an anode installed at opposite ends of the glass tube. The inert gases are injected into the glass tube, and phosphorus is applied to interior surfaces of the glass tube. The lamps 20 are grouped into an n-number of lamps (where n is a positive integer) which are mounted onto the lamp holder 22. Accordingly, the light generated from the lamps 20 is incident to the diffuser 10.

The diffuser 10 forces the light received from the lamps 20 to be directed toward a front surface of the LCD panel 6, thereby diffusing the light to produce a uniform distribution onto the LCD panel 6. The diffuser 10 includes a transparent resin film having opposing surfaces coated with light-diffusion materials.

In FIG. 3, the reflection sheet 12 is arranged along rear surfaces of the lamps 12, and has the same shape as the bottom cover 16. In addition, the reflection sheet 12 has a bottom surface overlapping the bottom surface of the bottom cover 16 and an inclination surface correspondingly bent to the inclination surface of the bottom cover 16. In addition, the bottom cover 16 has a bottom surface and an inclination surface extended from the bottom surface. For example, the bottom surface and the inclination surface of the bottom cover 16 are bent to have a stepped portion. Although not shown, the reflection sheet 12 is adhered to the bottom surface and the inclination surface of the bottom cover 16 by an adhesive tape. Accordingly, the reflection sheet 12 reflects light outgoing toward the rear surface and the side surface of the lamps 20 to the LCD panel 6, thereby improving light irradiation efficiency onto the LCD panel 6. In FIG. 3, the light radiated via the diffuser 10 is provided to the LCD panel 6 via the optical sheets 8 (in FIG. 1). The light radiated from the diffuser 10 provides diffused light, thereby increasing a viewing angle of the LCD panel 6. The efficiency of the light incident to the LCD panel 6 increases when the incident light is perpendicular to the LCD panel 6. Accordingly, the optical sheets 8 are disposed on the diffuser 10. The optical sheets 8 diffuse the light outgoing from the diffuser 10 and convert the light to be perpendicular to the LCD panel 6, thereby improving light efficiency.

In FIG. 2, the top case 2 has a square shape including a plane part and a side part bent perpendicularly to the plane part. Accordingly, the top case 2 serves to enclose the edges of the LCD panel 6 and the main support 14.

FIG. 4 is a schematic plan view of a color filter layer of the LCD module of FIG. 1 according to the related art. In FIG. 4, a color filter 25a has red R, green G, and blue B color pixels that are arranged in a stripe pattern, thereby transmitting light having specific wavelength bands to display colored light. Although not shown, a black matrix is formed between the red R, green G, and blue B color pixels of the color filter 25a. The black matrix separates the red R, green G, and blue B color pixels from each other and absorbs light received from an adjacent pixel, thereby preventing deterioration of image contrast.

Although not shown in FIG. 1, the LCD module 1 includes the color filter layer 25a and the back light unit of FIG. 3, wherein each of the colors of red R, green G, and blue B has a color wavelength band of more than 100 nm. In addition, wavelengths of other colors in addition to the colors of red R, green G, and blue B are produced, thereby deteriorating color purity, as shown in FIG. 5. However, in the LCD module 1, color purity of light passing through the color filter layer 25a is deteriorated to yield a low color representation ratio of 60% in comparison with a National Television System Committee (NTSC) standard, as shown in FIG. 6. Accordingly, increasing a thickness of the color filter 25a has been proposed to prevent the low color representation ratio. As a result, the color purity can be increased up to 80%. However, if the thickness of the color filter layer 25a is increased in order to increase the color purity, then the brightness of the LCD panel 6 is lowered by an amount of about 10%~about 20%, which results in a deteriorated display quality of the LCD module 1.

FIGS. 7A and 7B are schematic plan views of color filter layers of the LCD panel of FIG. 1 according to the related art. In FIGS. 7A and 7B, in order to prevent deterioration of brightness and increase the color representation ratio by raising the color purity, a four-color filter layer 25b includes a yellow color filter Y. Accordingly, the color representation ratio is increased up to 60%~70% in comparison with NTSC standard, as shown in FIG. 8A. Furthermore, if a five-color filter layer 25c includes a cyan color filter C, as shown in FIG. 7A, then the color representation ratio increases up to 70%~80% in comparison with NTSC standard, as shown in FIG. 8B. Moreover, if a six-color filter layer includes a magenta color filter M (not shown) color, then the color representation ratio increases up to more than 80% in comparison with NTSC standard.

However, if the color filter layers 25b and 25c are applied to the LCD panel 6 of FIG. 1, aperture ratio decreases, as shown in Table 1. If the aperture ratio decreases, then light efficiency of the LCD module 1 is reduced. Thus, display quality deteriorates.

TABLE 1

| color | color pixels | aperture ratio | change of aperture ratio | comparison of aperture ratio |
|---|---|---|---|---|
| RGB | 3 | 40.83% | 0 | 100% |
| RGBY | 4 | 40.68% | −0.4% | 99% |
| RGBYC | 5 | 33.61% | −17.6% | 82% |
| RGBYCM | 6 | 19.64% | −51.9% | 48% |

In addition, since the number of data ICs increases as the number of color pixels increases, production costs for the LCD module 1 increases. Moreover, since processes for forming the color filter layers 25b and 25c are complicated, low yield of the LCD module 1 results.

SUMMARY OF THE INVENTION

Accordingly, the present invention is directed to a liquid crystal display module and driving apparatus thereof that substantially obviates one of more of the problems due to limitations and disadvantages of the related art.

An object of the present invention is to provide an LCD module and driving apparatus thereof having an improving display quality.

Another object the present invention is to provide an LCD module and driving apparatus thereof having an increased color representation ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module includes a liquid crystal display panel, a plurality of lamps for irradiating a first light onto the liquid crystal display panel, and a back light unit including a plurality of light emitting diode arrays, each of the light emitting diode arrays having a plurality of light emitting diodes arranged between the lamps to irradiate a second light onto the liquid crystal display panel.

In another aspect, an apparatus of driving a liquid crystal display module includes a liquid crystal display panel, a plurality of lamps for irradiating a first light onto the liquid crystal display panel, a back light unit including a plurality of light emitting diode arrays, each light emitting diode array having a plurality of light emitting diodes arranged between the lamps for irradiating a second light onto the liquid crystal display panel, a lamp driving system for driving the lamps, a light emitting di de driving system for driving the light emitting diodes, a frame memory for storing image data, and a controller having a pattern analyzer for detecting the image data provided from the frame memory and a control signal generator for generating a control signal to control the lamp driver and the light emitting diode driving system in accordance with a result analyzed by the pattern analyzer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 8A and 8B are diagrams of color representation ratios of the color filter layers of FIGS. 7A and 7B, respectively, according to the related art;

DETAILED DESCRIPTION OF THE PREFERRED EMBODIMENTS

Reference will now be made in detail to the preferred embodiments of the present invention, examples of which are illustrated in the accompanying drawings.

Figure 1:
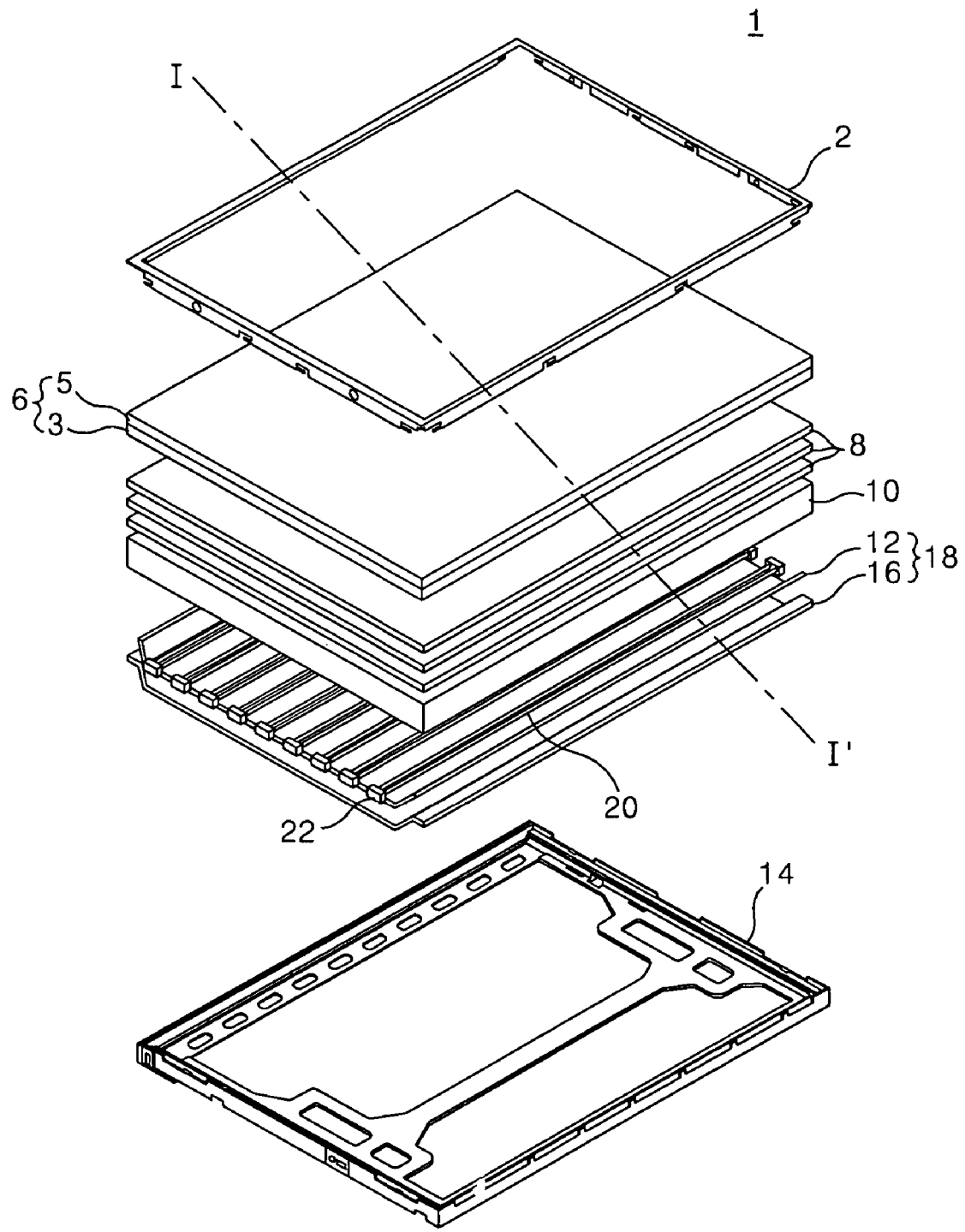
FIG. 1 is a perspective assembly view of an LCD module according to the related art.
Figure 2:
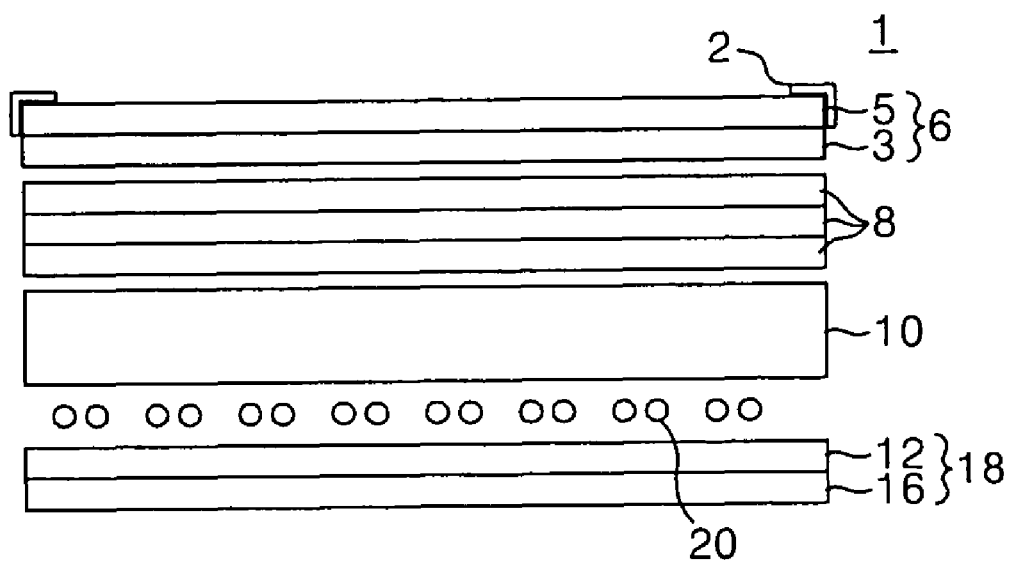
FIG. 2 is a cross sectional view along I-I' of FIG. 1 according to the related art.
Figure 3:
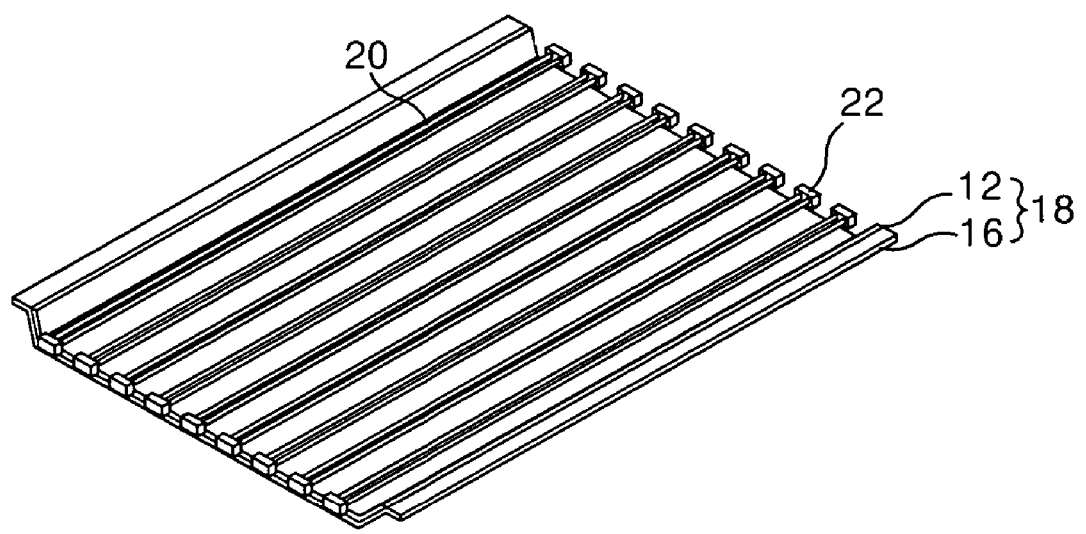
FIG. 3 is a perspective view of a back light unit of the LCD module of FIG. 1 according to the related art.
Figure 4:
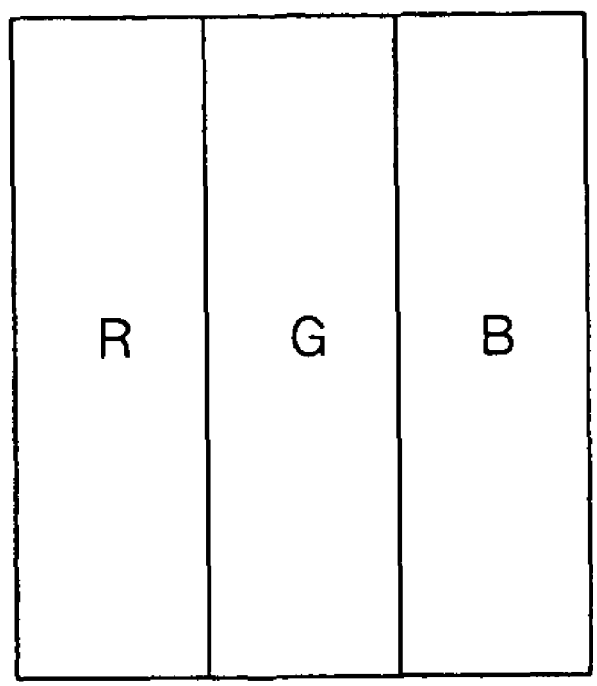
FIG. 4 is a schematic plan view of a color filter layer of the LCD module of FIG. 1 according to the related art.
Figure 5:
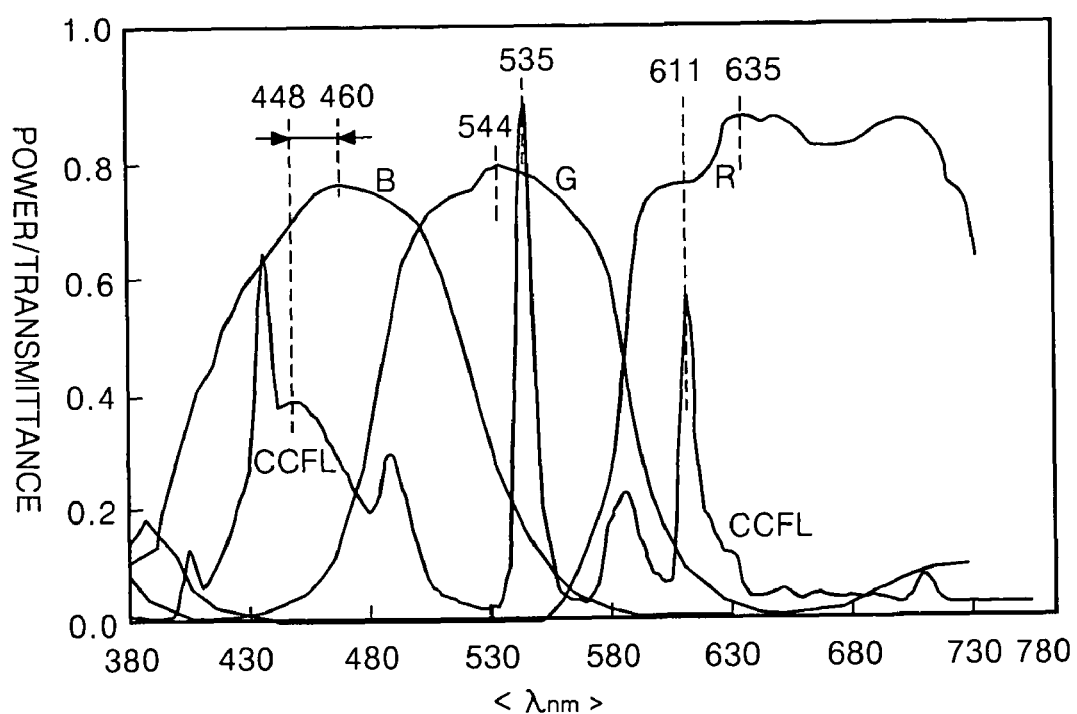
FIG. 5 is a diagram of a light spectrum of the color filter layer of FIG. 4 according to the related art.
Figure 6:
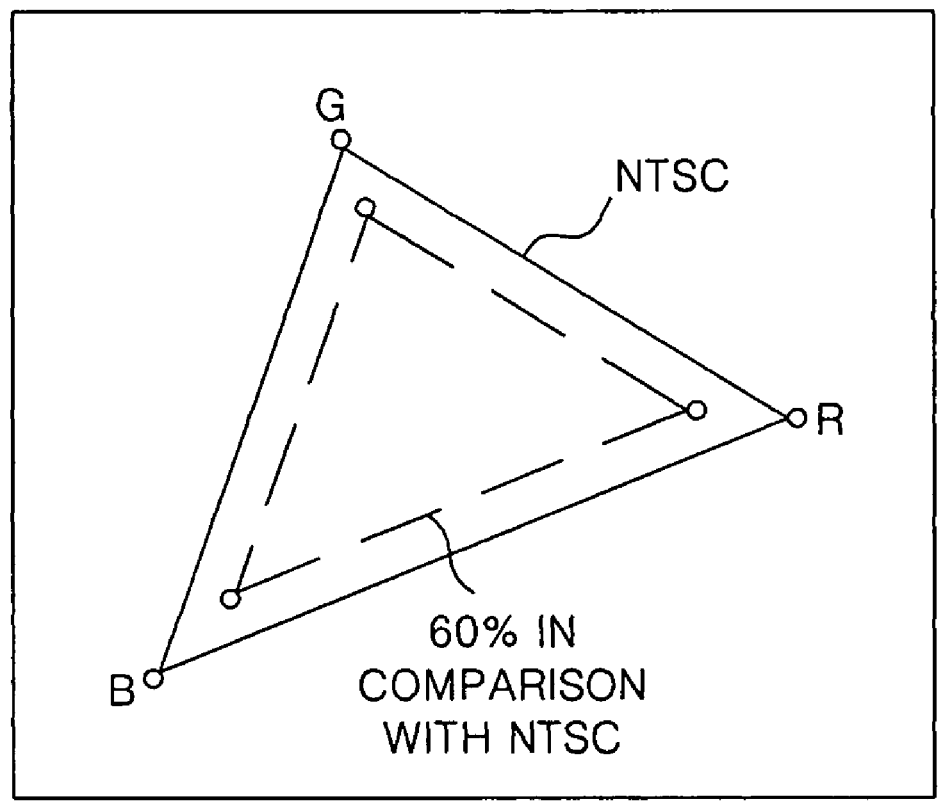
FIG. 6 is a diagram of a color representation ratio of the color filter of FIG. 4 according to the related art.
Figure 7A:
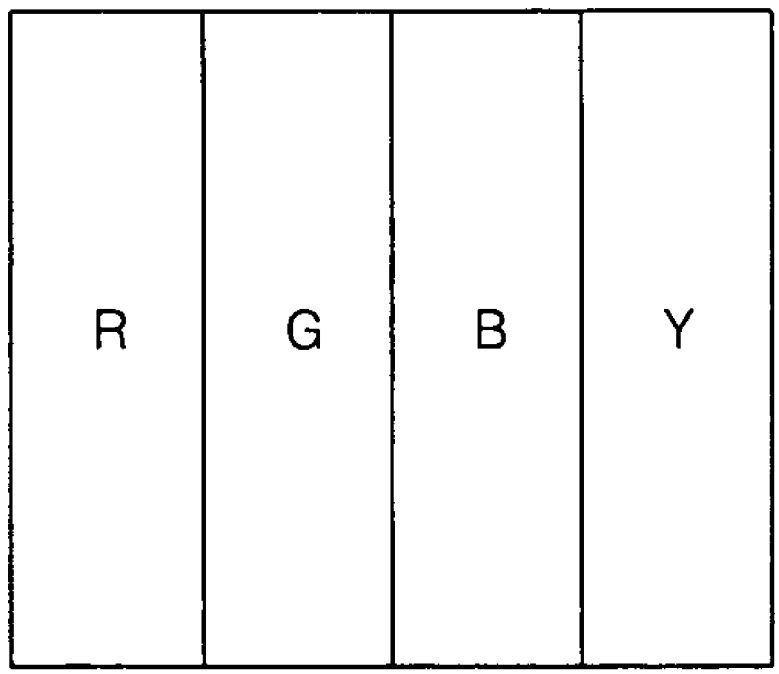
FIGS. 7A and 7B are schematic plan views of color filter layers of the LCD panel of FIG. 1 according to the related art.
Figure 7B:
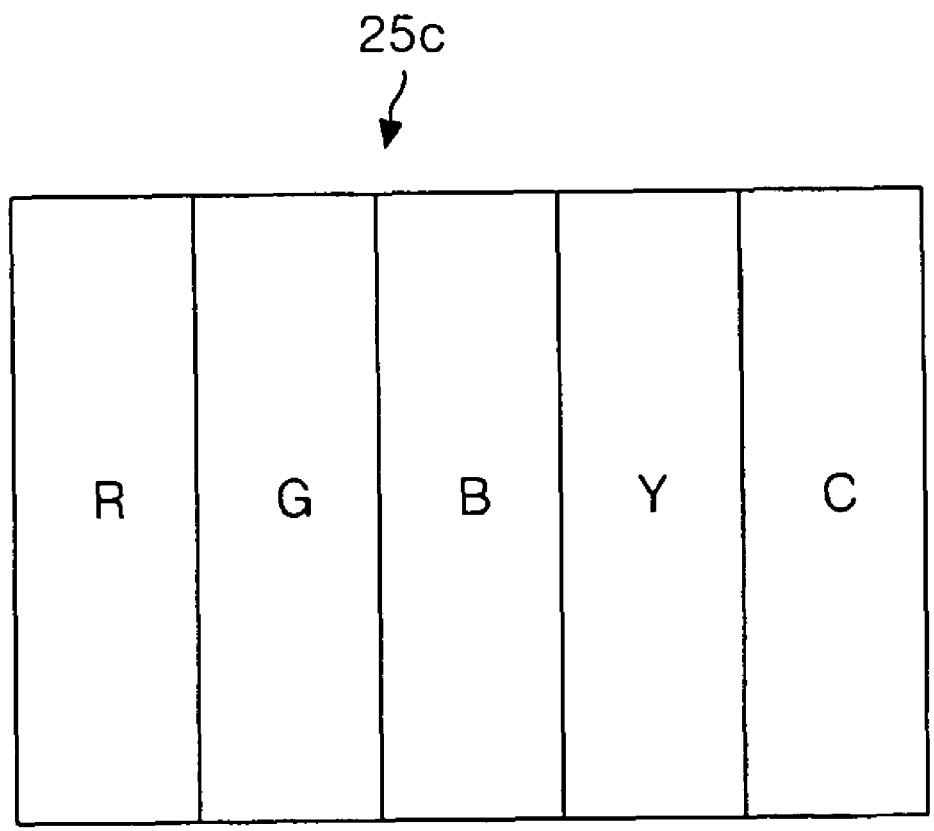
Figure 8A:
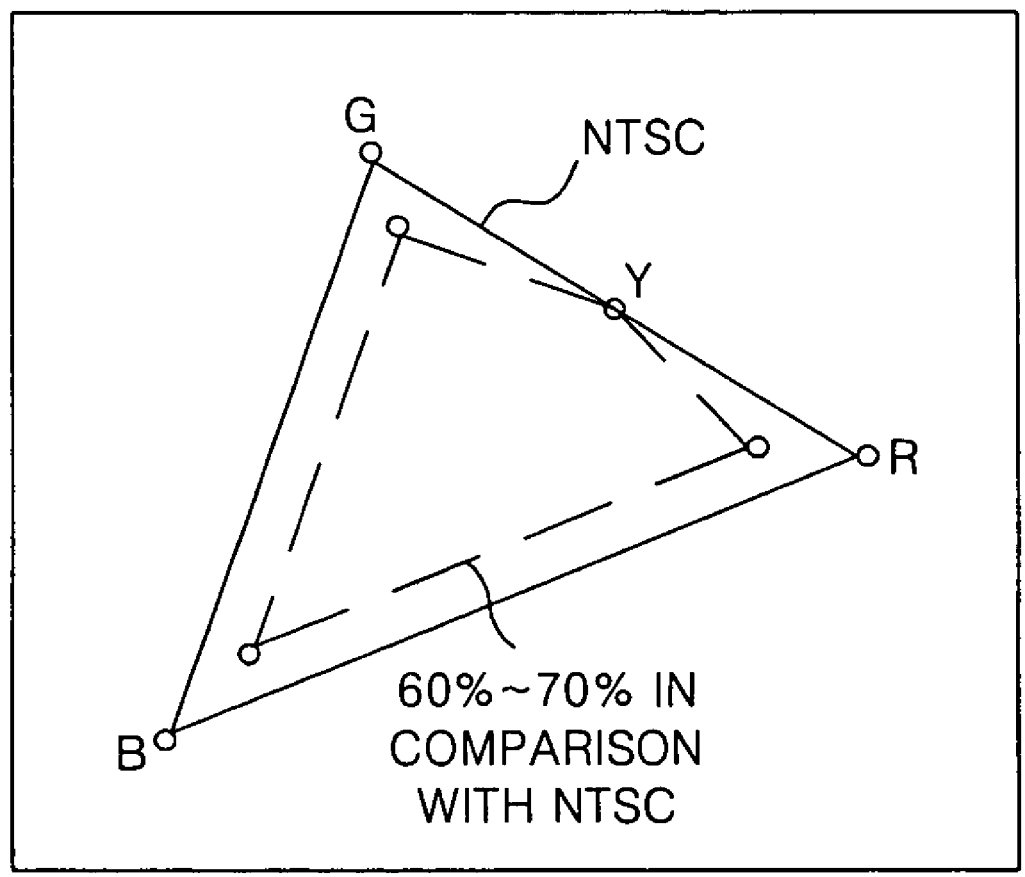
Figure 9:
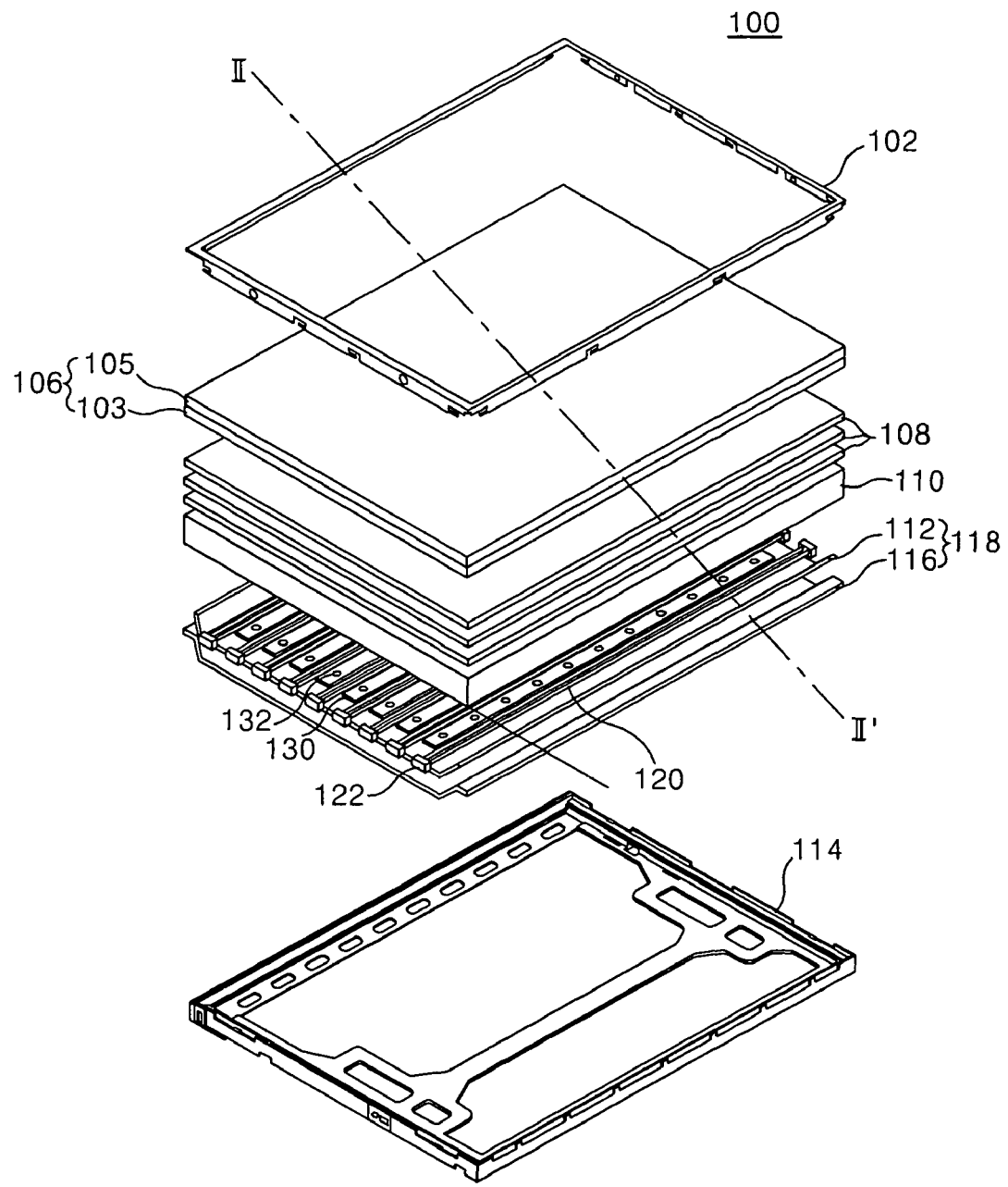
FIG. 9 is a perspective assembly view of an LCD module according to the present invention.
Figure 10:
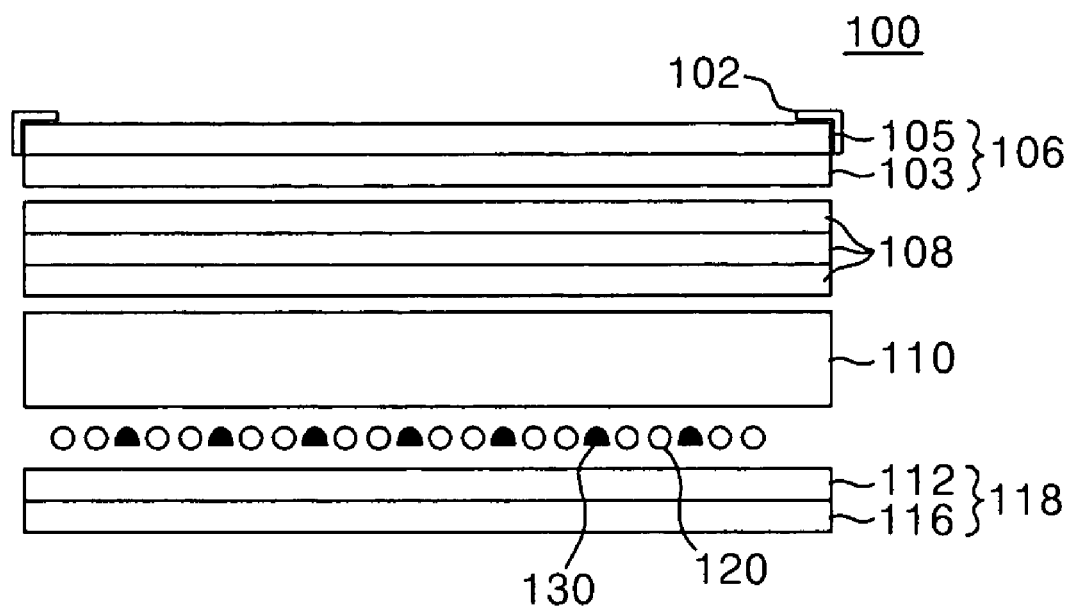
FIG. 10 is a cross sectional view along II-II' of FIG. 9 according to the present invention.

FIG. 9 is a perspective assembly view of an LCD module according to the present invention, and FIG. 10 is a cross sectional view along II-II' of FIG. 9 according to the present invention. In FIGS. 9 and 10, an LCD module 100 may include a main support 114, a backlight unit and a liquid crystal display-panel 106 stacked at an interior of the main support 114, and a case top 102 for enclosing edges of the LCD panel 106 and side surfaces of the main support 14.

The LCD panel 106 may include an upper substrate 105 and a lower substrate 103, and a liquid crystal material injected between the upper substrate 105 and the lower substrate 103. Although not shown, the LCD panel 106 may be provided with a spacer for maintaining a uniform gap between the upper substrate 105 and the lower substrate 103.

The upper substrate 105 of the LCD panel 106 may be provided with a color filter, a common electrode, and a black matrix (not shown), and the lower substrate 103 may include a plurality of signal lines (not shown), such as data lines and gate lines, and a thin film transistor (TFT) may be formed at each intersection between the data lines and the gate lines. The TFT may switch data signals transmitted along the data lines to a liquid crystal cell in response to scanning pulses (i.e., gate pulses) transmitted along the gate lines. In addition, a pixel electrode may be formed at a pixel area between the data lines and the gate lines.

One side of the lower substrate 103 may be provided with a pad area connected to each of the data lines and the gate lines. Although not shown, a TCP, which may include a driver IC for supplying driving signals to the TFTs, may be attached onto the pad area. Accordingly, the TCP may supply data signals from the driver IC to the data lines, and the TCP may supply scanning signals to the gate lines.

Although not shown, an upper polarizing sheet may be attached onto an upper substrate 105 of the LCD panel 106, and a lower polarizing sheet may be attached onto of a rear side of the lower substrate 103 of the LCD panel 106.

The main support 114 may be formed of a molded material whose inner side wall surface may be molded to have a stepped coverage face. In addition, a securing part of the main support 114 in which the back light unit and the LCD panel 106 are disposed may be formed on the stepped coverage face. Accordingly, the back light unit and the LCD panel 106 may be stacked at an interior of the main support 114.

Figure 11A:
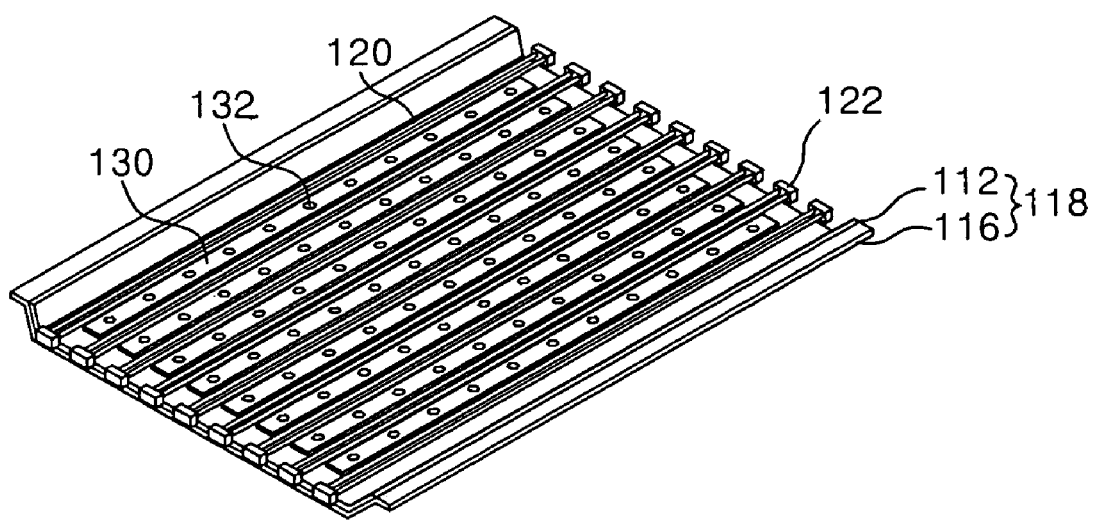
FIG. 11A is a perspective view of an exemplary back light unit of the LCD module of FIG. 9 according to the present invention.
Figure 11B:
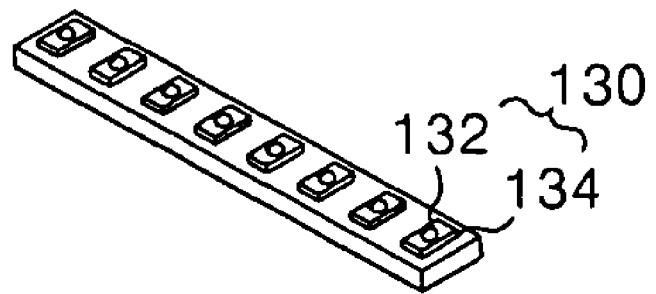
FIG. 11B is a perspective view of an exemplary light emitting diode array of the back light unit of FIG. 11A according to the present invention.

FIG. 11A is a perspective view of an exemplary back light unit of the LCD module of FIG. 9 according to the present invention, and FIG. 11B is a perspective view of an exemplary light emitting diode array of the back light unit of FIG. 11A according to the present invention. In FIG. 11A, a back light unit of the LCD module 106 may include a plurality of lamps 120 irradiating light onto the LCD panel 106, a plurality of lamp holders 122 upon which the lamps 120 may be fixedly mounted, a plurality of light emitting diode (LED) arrays 130 arranged between the lamps 120, a diffuser 110 diffusing incident light from the lamps 120 and the LED array 130 to irradiate the light onto the LCD panel 106, a lamp housing 118 arranged along rear surfaces of the lamps 20 and rear surfaces of the LED array 130, and a plurality of optical sheets 108 stacked on the diffuser 110 (in FIG. 9). In addition, as shown in FIG. 10, the top case 102 may have a planar part and a side part bent perpendicularly to the planar part such that the top case 102 may be fabricated in a square band shape. Thus, the top case 102 may enclose the edges of the liquid crystal display panel 106 and the main support 114.

The lamps 120 may include cold cathode fluorescent lamps, where each of the lamps 120 may include a glass tube, inert gases contained within the glass tube, and a cathode and an anode installed at opposing ends of the glass tube. The inert gases may be injected into the glass tube, and phosphorus may be applied to interior surfaces of the glass tube. In addition, the lamps 120 may be grouped into an N-number of lamps (where n is a positive integer), wherein each lamp group may be fixedly mounted onto the lamp holder 122. Accordingly, the light generated from the lamps 120 may be incident to the diffuser 110.

In FIG. 11B, each of the LED arrays 130 may include a plurality of LEDs 132 and a printed circuit board (PCB) 134 having a circuit for controlling light emitted from the LEDs 13. Each of the LEDs 132 may generate inherent colored light, such as red, green, blue, yellow, cyan, magenta, or white light, as a point light source. The PCB 134 may support the LEDs 132 and may have driving circuitry mounted thereon to control the light emitted from the LED 132. Accordingly, the light emitted from the LED 132 may be incident to the diffuser 110 (in FIG. 9).

In FIG. 9, the light emitted from the LEDs 132 and lamps 120 may proceed toward bottom and side surfaces of the lamps 120 and the LED array 130 and may be reflected by the reflection sheet 112. Accordingly, the light may proceed toward the diffuser 110. The diffuser 110 may force the light received from the lamps 120 and the LED arrays 130 to be directed toward a front surface of the LCD panel 106, and may diffuse the light to produce a uniform light distribution onto the LCD panel 106. The diffuser 110 may include a transparent resin film having opposing surfaces coated with a light-diffusion material.

In FIG. 11A, the lamp housing 118 may include the reflection sheet 112 and a bottom cover 116 arranged on the rear surface of the reflection sheet 112. The reflection sheet 112 may be arranged on the rear surfaces of the lamps 120 and the LED arrays 130, and may be made of a light reflecting material having the same shape as the bottom cover 116. In addition, the reflection sheet 112 may have a bottom surface overlapping a bottom surface of the bottom cover 116 and an inclination surface correspondingly bent to the inclination surface of the bottom cover 116. The reflection sheet 112 may be adhered to the bottom and inclination surfaces of the bottom cover 116 by an adhesive tape (not shown). Accordingly, the reflection sheet 112 may reflect the light outgoing toward the rear and side surfaces of the lamps 120 onto the LCD panel 106, thereby improving light efficiency irradiated onto the LCD panel 106.

In FIG. 9, the light radiated via the diffuser 110 may be provided onto the LCD panel 106 via a plurality of optical sheets 108, and the light radiated from the diffuser 110 may increase a viewing angle of the LCD module 100. Since the efficiency of light increases when the incident light is perpendicular to the LCD panel 106, the optical sheets 108 may be arranged on the diffuser 110. Each of the optical sheets 108 may diffuse the light outgoing from the diffuser 110 and transform the light to be perpendicular to the LCD panel 106 in order to improve the light efficiency. Accordingly, the light outgoing from the diffuser 110 reaches to the LCD panel 106 via the optical sheet 108.

Figure 13:
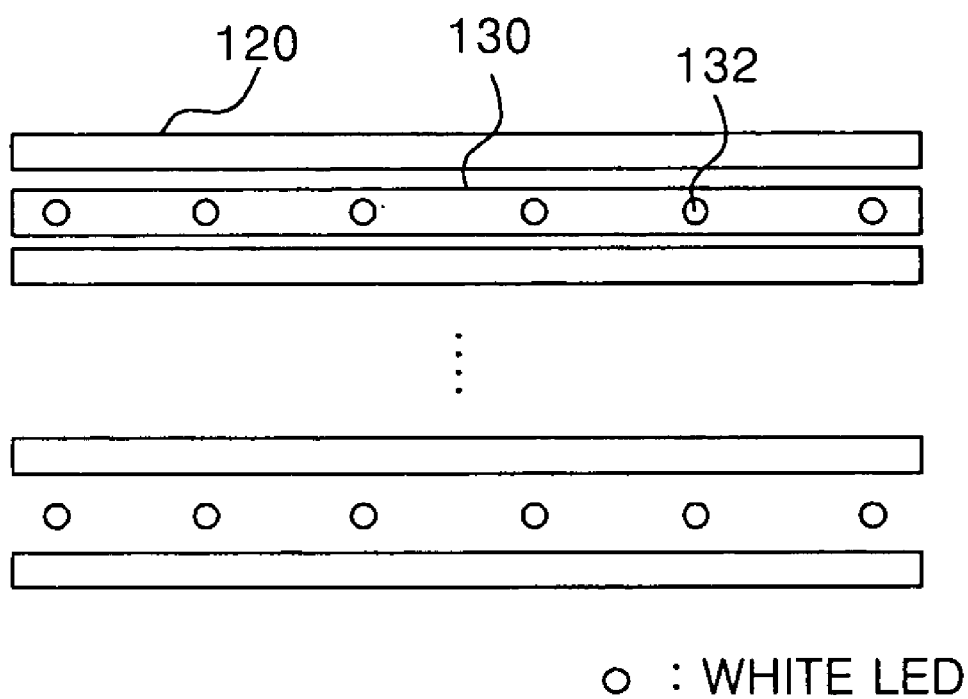
FIG. 13 is a plan view of an exemplary back light unit according to the present invention.

FIG. 13 is a plan view of an exemplary back light unit according to the present invention. In FIG. 13, a back light unit may include a plurality of the lamps 120 and a plurality of the LED arrays 130, wherein each of LED arrays 130 may have a plurality of white LEDs 132 emitting white light onto the LCD panel 106 (in FIG. 15). Accordingly, the LCD module 100 (in FIG. 9) may improve color representation ratio up to a level of about 80% in comparison with the NTSC standard by increasing the color purity. Moreover, the LCD module 100 (in FIG. 9) may improve brightness of the LCD panel 106 (in FIG. 15) by arranging the white LEDs 132 to emit the white light onto the LCD panel 106 (in FIG. 15). As a result, brightness of the LCD panel 106 (in FIG. 15) may be improved, thereby improving display quality of the LCD module 100 (in FIG. 9).

Figure 14A:
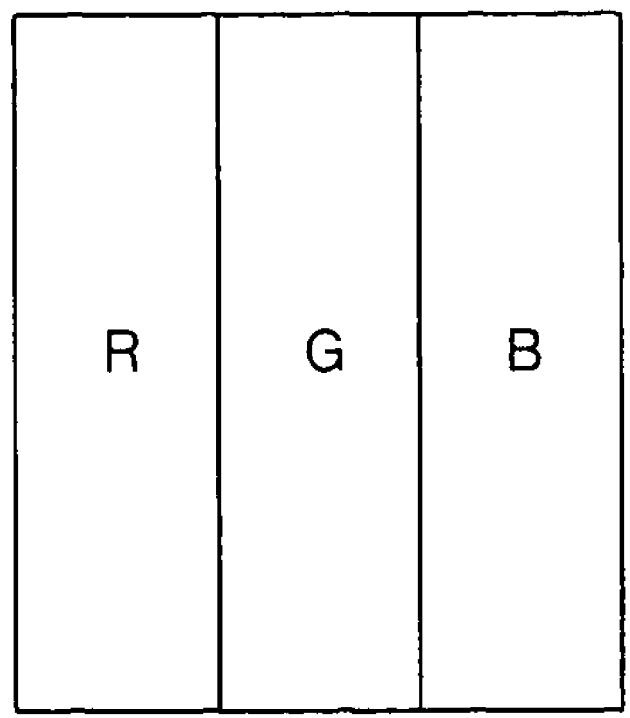
FIG. 14A is a schematic plan view of an exemplary color filter layer according to the present invention.

FIG. 14A is a schematic plan view of an exemplary color filter layer according to the present invention. In FIG. 14A, an LCD module may include a color filter 125a having three color pixels of red R, green G, and blue B in order to maximize an aperture ratio of the LCD panel 106 (in FIG. 18). The color filter 125a may include color pixels of red R, green G, and blue B arranged in a stripe-type alignment. The color filter 125a may transmit light having specific wavelength bands to produce different colors of light. Although not shown, a black matrix may be formed between the color pixels of red R, green G, and blue B of the color filter 125a to absorb any light that may enter from adjacent pixels, thereby preventing deterioration of image color contrast.

Figure 12A:
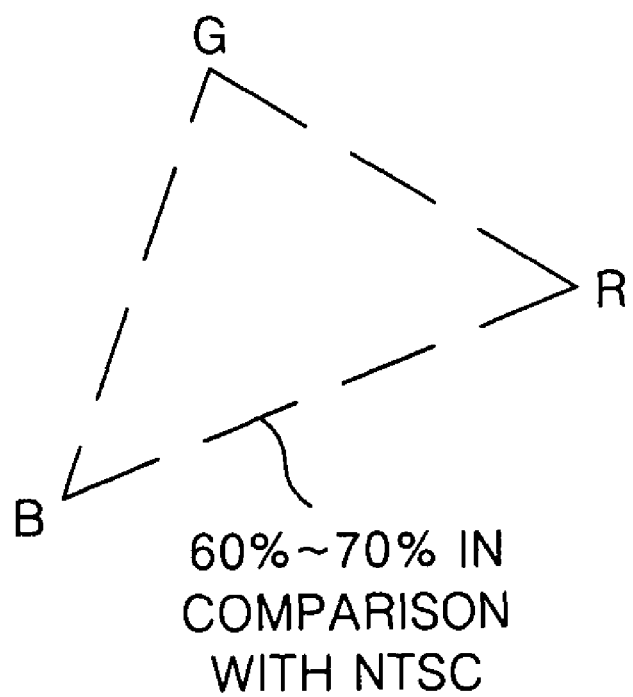
FIG. 12A is a diagram of an exemplary color representation ratio of an LCD module according to the present invention.
Figure 12B:
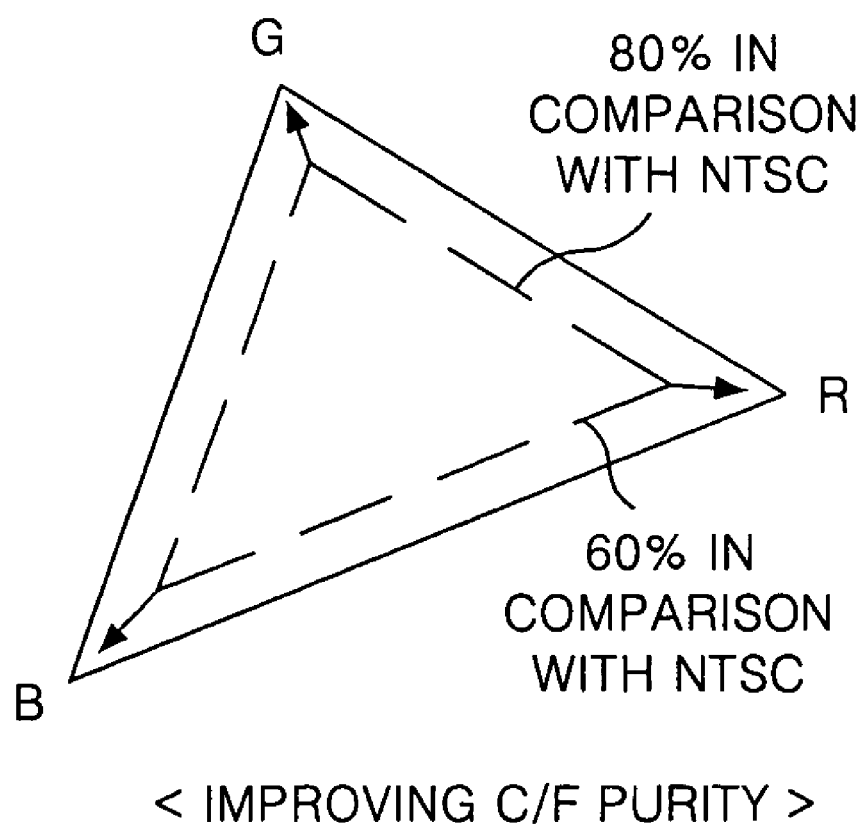
FIG. 12B is a diagram of another exemplary color representation ratio of an LCD module according to the present invention.
Figure 14B:
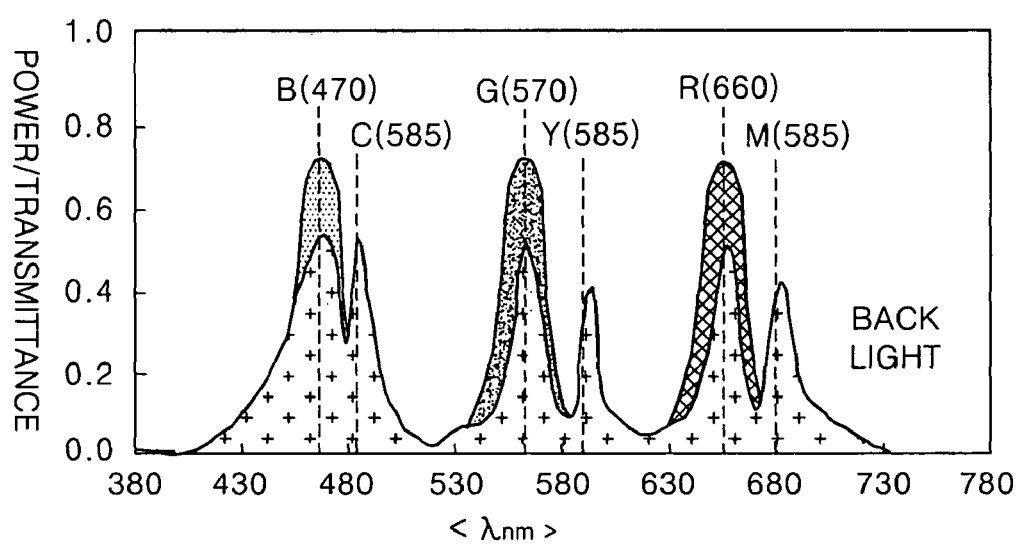
FIG. 14B is a diagram of an exemplary light spectrum of the color filter layer of FIG. 14A according to the present invention.

If the color filter 125a is applied to the LCD panel 106 (in FIG. 15), then a color representation ratio of about 60%~70% is produced, as compared with the NTSC standard shown in FIG. 12A. If a thickness of the color filter 125a is increased to raise color purity, then the color representation ratio can be improved up to about 80% in comparison with the NTSC standard, as shown in FIG. 12B. If the color purity of the color filter 125a is increased, then each color of red R, green G, and blue B may have a color wavelength band of about 30nm, as shown in FIG. 14B. If the color representation ratio is improved by increasing the color purity, then a large amount of wavelengths corresponding to colors other than the red R, green G, and blue B colors may be removed. Accordingly, the color purity of each of red R, green G, and blue B colors may be increased. However, if the color representation ratio is improved by increasing the color purity of the color filter 125a, then a brightness of the LCD panel 106 (in FIG. 15) may be lowered by about 10%~about 20%.

Figure 15:
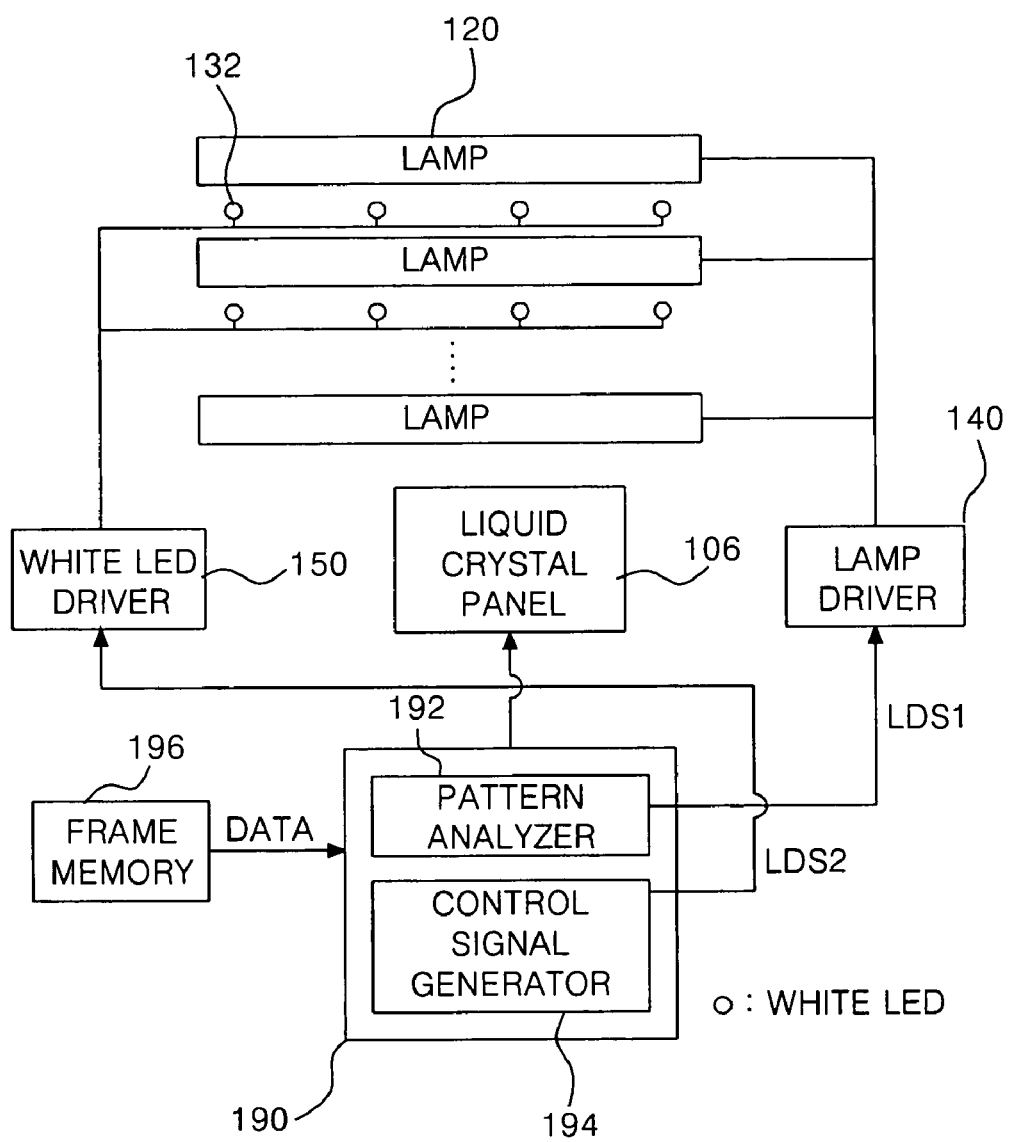
FIG. 15 is a schematic diagram of an exemplary driving apparatus of an LCD module according to the present invention.

FIG. 15 is a schematic diagram of an exemplary driving apparatus of an LCD module according to the present invention. In FIG. 15, a driving apparatus may include an LCD panel 106, a plurality of lamps 120 to irradiate light onto the LCD panel 106, a plurality of white LEDs 132 to emit white light, a lamp driver 140 to drive the lamps 120, a white LED driver 150 to drive the white LEDs 132, a frame memory 196 to receive image data from an external source and to store the image data by a frame unit, and a controller 190 to control the LCD panel 106, the lamp driver 140, and the white LED driver 150 in accordance with the image data detected from the image data stored in the frame memory 196. The LCD panel 106 may display images by using the light emitted from the lamps 120 and the white LEDs 132. Detailed explanation on the lamps 120 and the white LEDs 132 may be found above with respect to description of FIGS. 9 to 11B.

The controller 190 may include a pattern analyzer 192 receiving the image data stored in the frame memory 196 by a frame unit and detecting bright data from the image data, and a control signal generator 194 generating a control signal for controlling the lamp driver 140 and the white LED driver 150 in accordance with a result analyzed by the pattern analyzer 192. Furthermore, the controller 190 may supply the image data from the frame memory 196 to the LCD panel 106 to control a driving timing for the LCD panel 106. The controller 190 may generate a lamp driving signal LDS1 for driving the lamps 120 and may supply the signal LDS1 to the lamp driver 140. In addition, the controller 190 may generate an LED driving signal. LDS2 for driving the white LEDs 132 to supply the signal LDS2 to the white LED driver 150.

In FIG. 15, the pattern analyzer 192 may analyze the image data by frame unit stored in the frame memory 196 to detect bright image data from the image data. Accordingly, the pattern analyzer 192 may generate a detection signal corresponding to a brightness level and location information on the detected bright image data. In response to the detection signal from the pattern analyzer 192, the control signal generator 194 may supply the LED driving signal LDS2 to the white LED driver 150, wherein the signal LDS2 may be used to light-emit the white LEDs 132 among the white LEDs 132 associated with the location information on the bright image data.

The lamp driver 140 may turn ON the lamps 120 in response to the lamp driving signal LDS1 from the controller 190. In addition, the lamp driver 140 may continually turn ON the lamps 120, or may sequentially turn ON the lamps 120 in accordance with by a driving method of a scanning back light.

The white LED driver 150 may operate the white LEDs 132 relevant to the location of the bright image data among the image data in response to the LED driving signal LDS2 from the controller 190. Accordingly, the white light emitted from the white LEDs 132 may be irradiated onto the LCD panel 106, thereby improving a brightness of the LCD panel 106.

In addition, specific image data among the image data may cause a momentarily bright display within a particular region in the LCD panel 106. For example, the image data may be momentarily displayed with a peak brightness by using the light emitted from the white LEDs 132, thereby displaying a relatively high brightness image. Thus, it is possible to improve the display quality of the LCD module.

Figure 16:
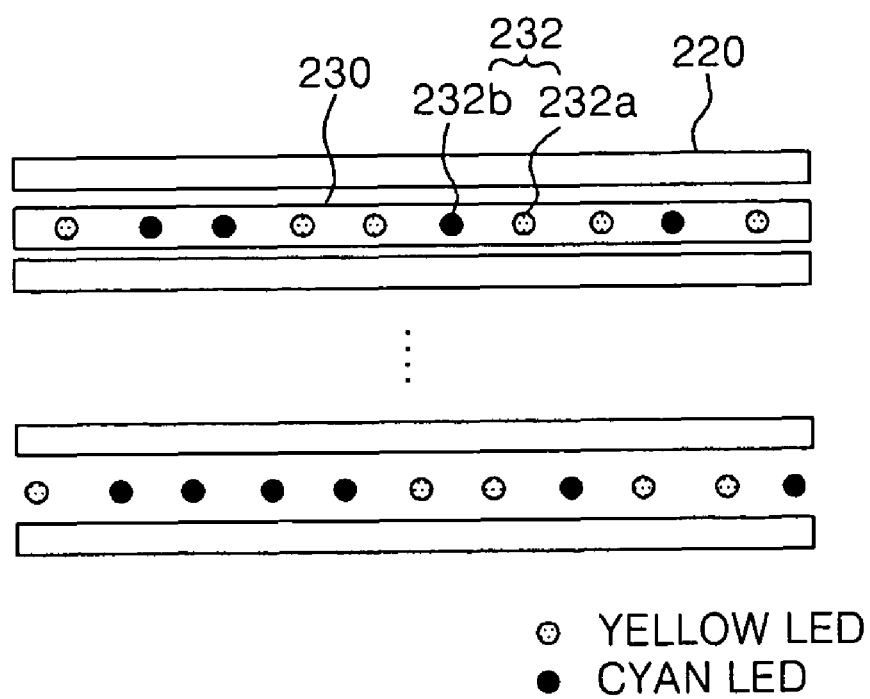
FIG. 16 is a plan view of another exemplary back light unit according to the present invention.
Figure 17A:
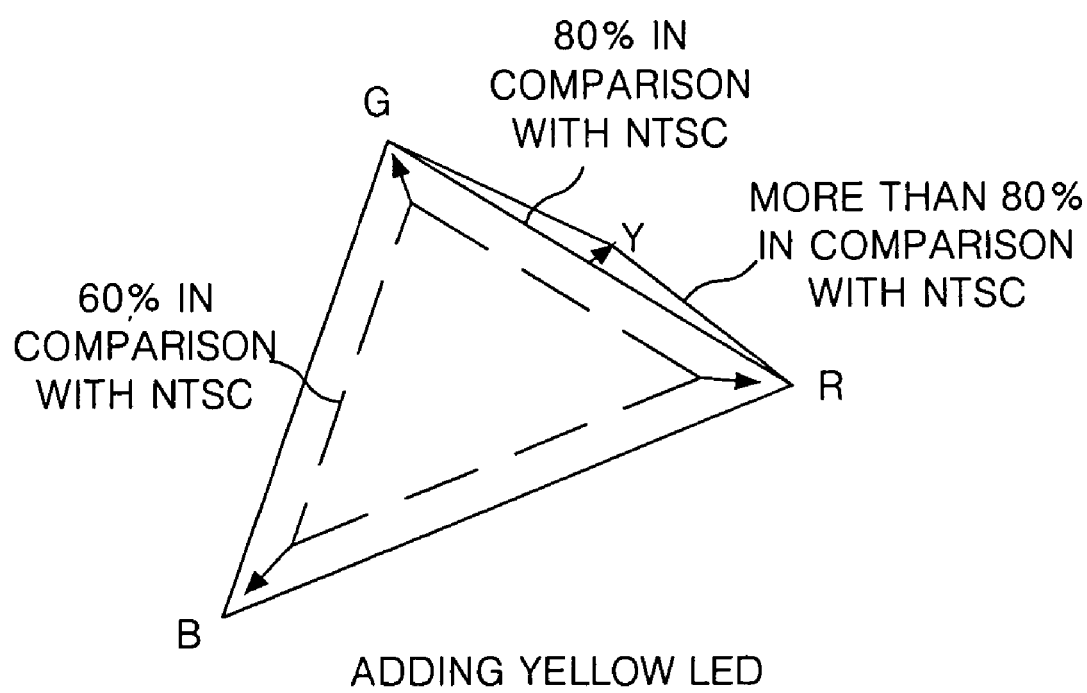
FIGS. 17A and 17B are diagrams of exemplary color representation ratios of an LCD module according the present invention.
Figure 17B:
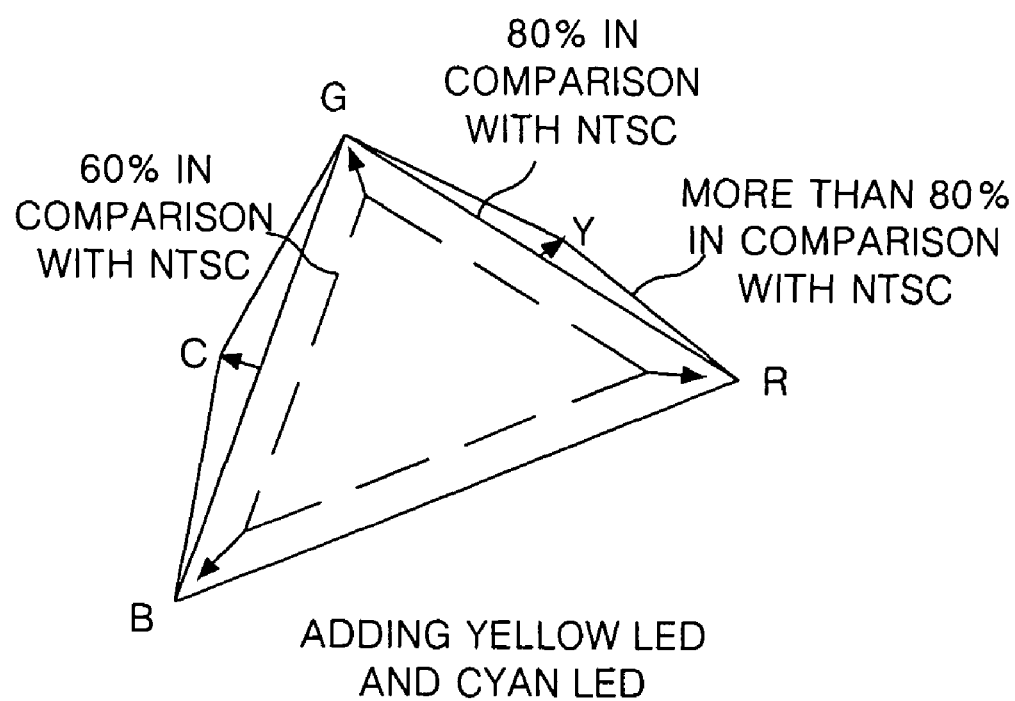

FIG. 16 is a plan view of another exemplary back light unit according to the present invention. In FIG. 16, a liquid crystal display module may include a direct-below-type back light unit including a plurality of lamps 220 and a plurality of LED arrays 230, thereby improving color representation ratio and brightness. Each of the LED arrays 230 may include a plurality of LEDs 232 each of which may emit its own unique coherent color. The LEDs 232 may include a plurality of yellow LEDs 232a to emit yellow colored light and a plurality of cyan LEDs 232b to emit cyan colored light. The yellow colored light and the cyan colored light emitted from the yellow LEDs 232a and the cyan LEDs 232b may be irradiated to the LCD panel 206 (in FIG. 18). Accordingly, the color representation ratio may be improved and a level of about 80% may be achieved as compared with the NTSC standard by increasing the color purity of the color filter 125a. Moreover, the color representation ratio may be improved up to a level of about 80% in comparison with the NTSC standard, as shown in FIGS. 17A and 17B by arranging the yellow LEDs 232a and the cyan LEDs 232b to emit the yellow and cyan colored lights and emit blue colored light by combining the yellow LEDs 232a and the cyan LEDs 232b to be irradiated onto the LCD panel 206 (in FIG. 18). Furthermore, display quality of the LCD module may be improved and brightness of the LCD panel 206 (in FIG. 18) may be increased.

Figure 18:
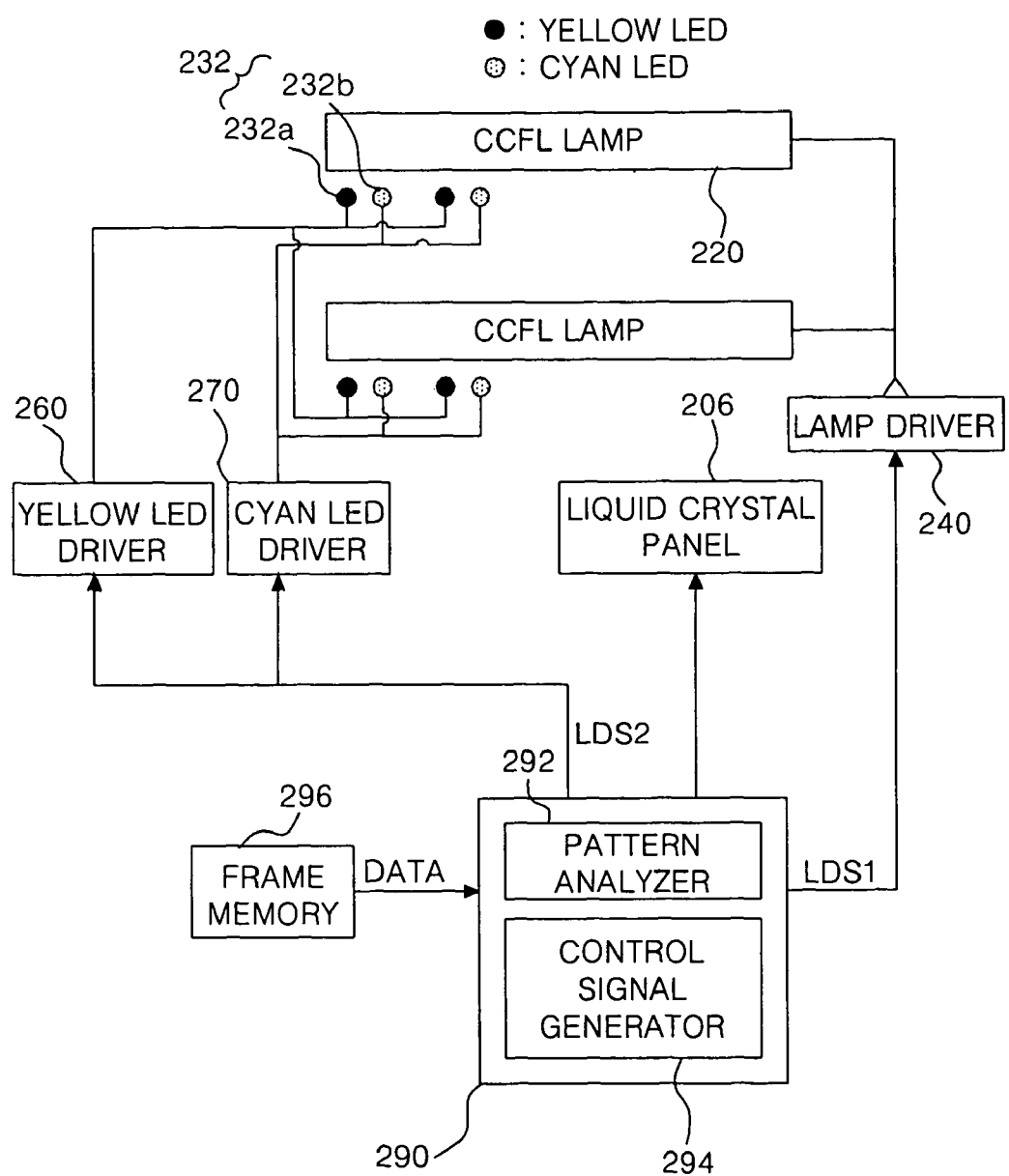
FIG. 18 is a schematic diagram of another exemplary driving apparatus of an LCD module according to the present invention.

FIG. 18 is a schematic diagram of another exemplary driving apparatus of an LCD module according to the present invention. In FIG. 18, a driving apparatus may include an LCD panel 206, a plurality of lamps 220, a plurality of yellow LEDs 232a emitting yellow colored light and a plurality of cyan LEDs 232b emitting cyan colored light on the LCD panel 206, a lamp driver 240 to drive the lamps 220, a yellow LED driver 260 to drive the yellow LEDs 232a, a cyan LED driver 270 to drive the cyan LEDs 232b, a frame memory 296 to receive image data from an external source to be stored by frame unit; and a controller 290 to control the LCD panel 206, a lamp driver 240, the yellow LED driver 260, and the cyan LED driver 270 in accordance with a result for the image data detected from the image data stored in the frame memory 296. The LCD panel 206 may display colored images by using the light emitted from the lamps 220, the yellow LEDs 232a, and the cyan LEDs 232b.

Detailed explanation of the lamps 220, the yellow LEDs 232a, and the cyan LEDs 232b have been omitted for the sake of brevity, and may be similar to the explanation provided with respect to the features shown in FIGS. 9 to 11B.

The controller 290 may include a pattern analyzer 292 receiving the image data stored in the frame memory 296 by frame unit to detect bright data from the image data, a control signal generator 294 generating a control signal for controlling the lamp driver 240, the yellow LED driver 260, and the cyan LED driver 270 in accordance with a result analyzed by the pattern analyzer 292. Accordingly, the controller 290 may supply the image data from the frame memory 296 to the LCD panel 206 to control a driving timing of the LCD panel 206. Furthermore, the controller 290 may generate a lamp driving signal LDS1 for driving the lamps 220 to supply the signal LDS1 to the lamp driver 240, and may generate an LED driving signal LDS2 for driving the yellow LEDs 232a and the cyan LEDs 232b to supply the signal LDS2 to the yellow LED driver 260 and the cyan LED driver 270.

The pattern analyzer 292 may analyze the image data stored in the frame memory 296 by frame unit to detect bright image data and to detect high color purity image data from the image data. In addition, the pattern analyzer 292 may generate a detection signal corresponding to information on a brightness level, color purity, and a location for the detected bright image data and the detected high color purity image data.

In response to the detection signal from the pattern analyzer 292, the control signal generator 294 may supply the LED driving signal LDS2 to the yellow LED driver 260 and the cyan LED driver 270. The signal LDS2 may be used to light-emit the yellow LEDs 232a and the cyan LEDs 232b among the yellow LEDs 232a and the cyan LEDs 232b, associated with the location information for the bright image data and the high color purity image data.

The lamp driver 240 may turn ON the lamps 220 in response to the lamp driving signal LDS1 from the controller 290. For example, the lamp driver 240 may continually turn ON the lamps 220, or may sequentially turn ON the lamps 220 in accordance with a driving method of a scanning back light.

The yellow LED driver 260 and the cyan LED driver 270 may operate the yellow LEDs 232a and the cyan LEDs 232b associated with the location information for the bright image data and the high color purity image data in response to the LED driving signal LDS2 from the controller 290. Accordingly, the driving apparatus may irradiate the yellow colored light and the cyan colored light emitted from the yellow LEDs 232a and the cyan LEDs 232b, respectively, onto the LCD panel 206, thereby improving the color representation ratio and the brightness of the LCD panel 206.

Figure 19:
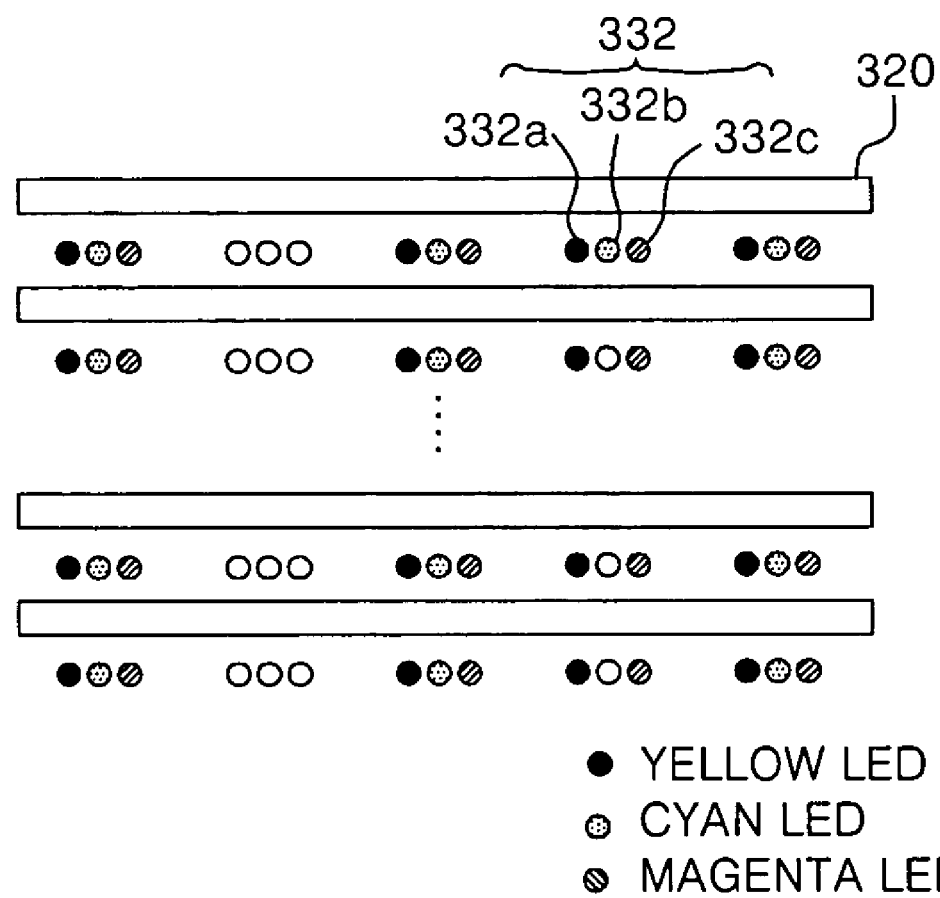
FIG. 19 is a plan view of another exemplary back light unit according to the present invention.

FIG. 19 is a plan view of another exemplary back light unit according to the present invention. In order to maximize aperture ratio of the LCD panel 206 (in FIG. 18), an LCD module may include a color filter 125a including three-color pixel of red R, green G, and blue B, as shown in FIG. 14A.

In FIG. 19, an LCD module may include a direct-below-type back light unit including a plurality of lamps 320 and a plurality of LED arrays to improve color representation ratio and brightness. Each of the LED arrays, which may be supplied to the direct-below-type back light unit of the LCD module, may include a plurality of LEDs 332, each of which may emit its own coherent color of light. The LEDs 332 may include a plurality of yellow LEDs 332a to emit yellow colored light, a plurality of cyan LEDs 332b to emit cyan colored light, and a plurality of magenta LEDs 332c to emit magenta colored light. Accordingly, the LEDs 332 may irradiate the yellow colored light, the cyan colored light, and the magenta colored light emitted from the yellow LEDs 332a, the cyan LEDs 332b, and the magenta LEDs 332c onto the LCD panel 306 (in FIG. 21).

Figure 20:
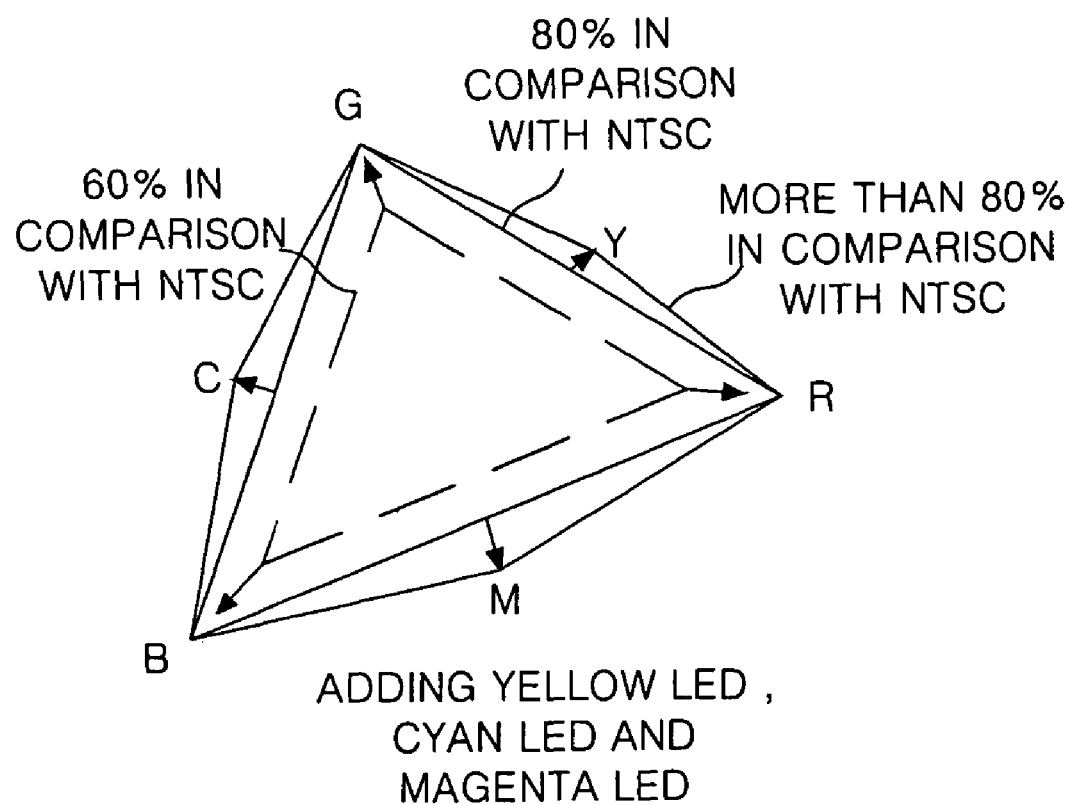
FIG. 20 is a diagram of another exemplary color representation ratio of an LCD module according the present invention.

Accordingly, color representation ratio may be improved up to a level of about 80% in comparison with the NTSC standard by increasing color purity of the color filter 125a. Moreover, the LCD module may improve the color representation ratio up to a level of about 80% in comparison with the NTSC standard, as shown in FIG. 20, by arranging in the direct-below type back light unit the yellow LEDs 332a emitting the yellow colored light, the cyan LEDs 332b emitting the cyan colored light, and the magenta LEDs 332c emitting the magenta colored light so that the yellow colored light, the cyan colored light, and the magenta colored light may be irradiated onto the LCD panel 306 (in FIG. 21). Furthermore, the display quality of the LCD module by improving may be improved and the brightness of the LCD panel 306 (in FIG. 21) may be increased.

Figure 21:
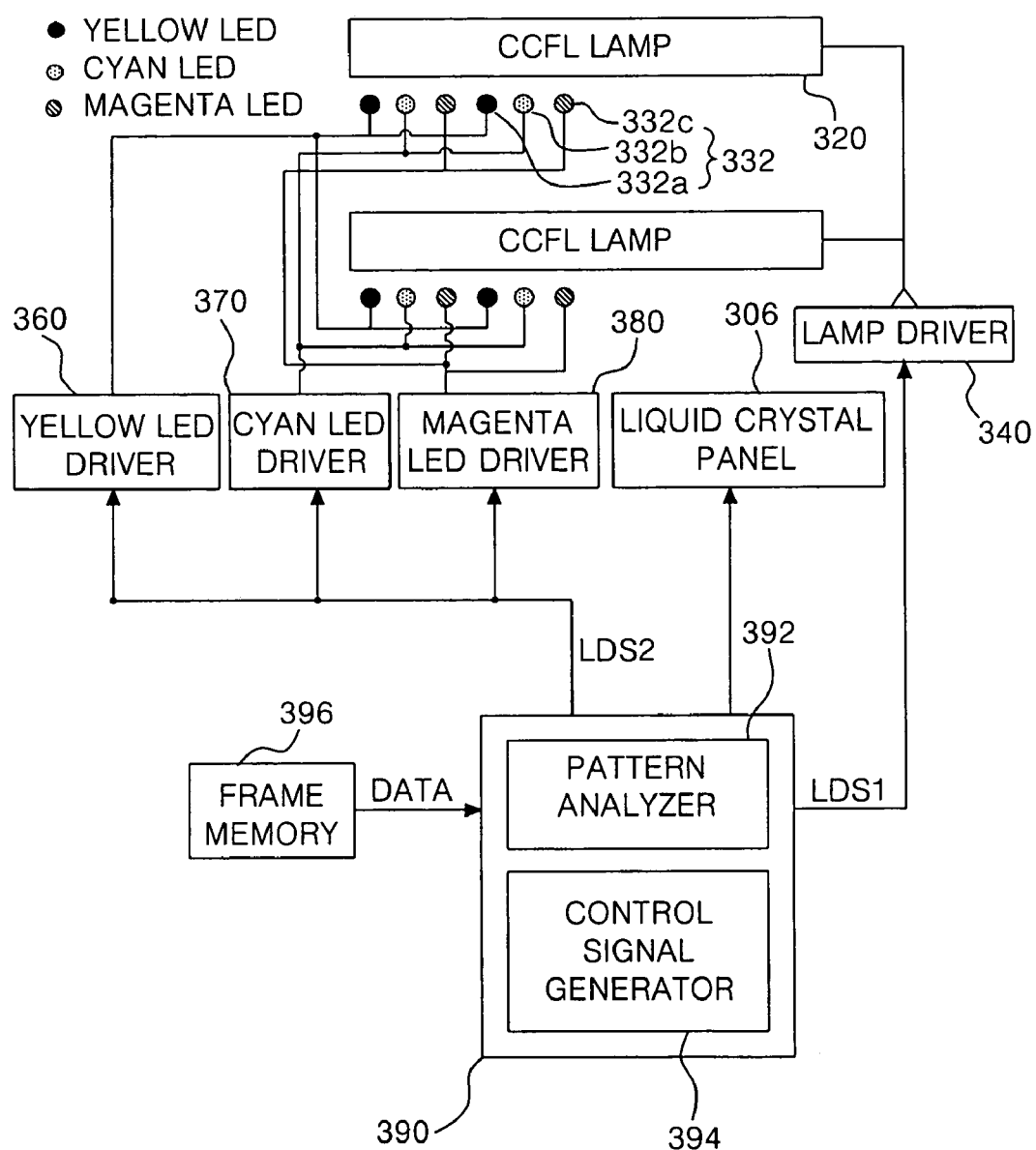
FIG. 21 is a schematic diagram of another exemplary driving apparatus of an LCD module according to the present invention.

FIG. 21 is a schematic diagram of another exemplary driving apparatus of an LCD module according to the present invention. In FIG. 21, a driving apparatus may include an LCD panel 306, a plurality of lamps 320, a plurality of yellow LEDs 332a emitting yellow colored light, a plurality of cyan LEDs 332b emitting cyan colored light, and a plurality of magenta LEDs 332c emitting magenta colored light, a lamp driver 340 to drive the lamps 320, a yellow LED driver 360 to drive the yellow LEDs 332a, a cyan LED driver 370 to drive the cyan LEDs 332b, a magenta LED driver 380 to drive the magenta LEDs 332c, a frame memory 396 to receive image data from an external source to be stored by frame unit, and a controller 390 to control the LCD panel 306, a lamp driver 340, the yellow LED driver 360, the cyan LED driver 370, and the magenta LED driver 380 in accordance with a result for the image data detected from the image data stored in the frame memory 396.

The LCD panel 306 may display images by using the light emitted from the lamps 320, the yellow LEDs 332a, the cyan LEDs 332b, and the magenta LEDs 332c. Detailed explanation of the lamps 320, the yellow LEDs 332a, the cyan LEDs 332b, and the cyan LEDs 332b may be found above with respect to features of FIGS. 9 to 11B.

The controller 390 may include a pattern analyzer 392 receiving the image data stored in the frame memory 396 by frame unit to detect bright data from the image data, a control signal generator 294 generating a control signal for controlling the lamp driver 340, the yellow LED driver 360, the cyan LED driver 370, and the magenta LED driver 380 in accordance with a result analyzed by the pattern analyzer 392. The controller 390 may supply the image data from the frame memory 396 to the LCD panel 306 to control a driving timing of the LCD panel 306. Furthermore, the controller 390 may generate a lamp driving signal LDS1 for driving the lamps 320 to supply the signal LDS1 to the lamp driver 340, and may generate an LED driving signal LDS2 for driving the yellow LEDs 332a, the cyan LEDs 332b, and the magenta LEDs 332c to supply the signal LDS2 to the yellow LED driver 360, the cyan LED driver 370, and the magenta LED driver 380.

The pattern analyzer 392 may analyze the image data by frame unit stored in the frame memory 396 to detect bright image data and high color purity image data from the image data. Then, the pattern analyzer 392 may generate a detection signal corresponding to information regarding brightness level, color purity, and location for the detected bright image data and the detected high color purity image data.

In response to the detection signal from the pattern analyzer 392, the control signal generator 394 may supply the LED driving signal LDS2 to the yellow LED driver 360, the cyan LED driver 370, and the magenta LED driver 380. The signal LDS2 may be used to light-emit the yellow LEDs 332a, the cyan LEDs 332b, and the magenta LEDs 332c associated with the location information for the bright image data and the high color purity image data.

The lamp driver 340 may turn ON the lamps 320 in response to the lamp driving signal LDS1 from the controller 390. For example, the lamp driver 340 may continually turn ON the lamps 320, or may sequentially turn ON the lamps 320 in accordance with a driving method of a scanning back light.

The yellow LED driver 360, the cyan LED driver 370, and the magenta driver 380 may operate the yellow LEDs 332a, the cyan LEDs 332b, and the magenta LEDs 332c, respectively, associated with the location information for the bright image data and the high color purity image data in response to the LED driving signal LDS2 from the controller 390. Accordingly, the driving apparatus causes irradiation of the yellow light, the cyan light, and the magenta light emitted from the yellow LEDs 332a, the cyan LEDs 332b, and the magenta LEDs 332c, respectively, to the LCD panel 306, thereby improving color representation ratio and brightness of the LCD panel 306.

Figure 22:
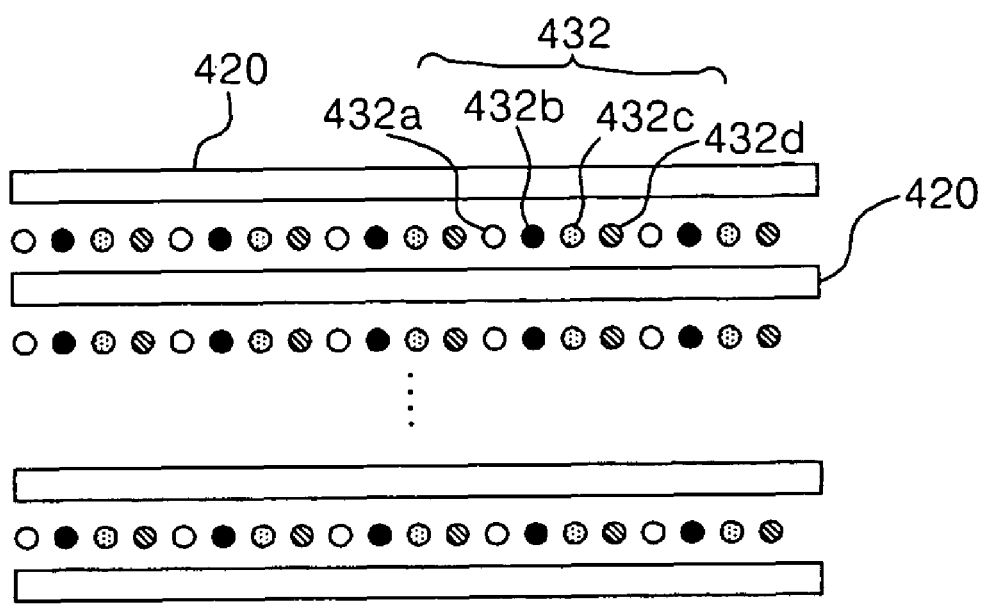
FIG. 22 is a plan view of another exemplary back light unit according to the present invention.

FIG. 22 is a plan view of another exemplary back light unit according to the present invention. In FIG. 22, an LCD module may include a direct-below-type back light unit having a plurality of lamps 420 and a plurality of LED arrays 432 in order to improve color representation ratio and brightness. Each of the LED arrays 432 may include a plurality of white LEDs 432a to emit white colored light, a plurality of yellow LEDs 432b to emit yellow colored light, a plurality of cyan LEDs 432c to emit cyan colored light, and a plurality of magenta LEDs 432d to emit magenta colored light. Accordingly, the LEDs 432 may irradiate the white, yellow, cyan, and magenta colored lights onto the LCD panel 406 (in FIG. 23).

Accordingly, the LCD module according to the present invention is capable of improving color representation ratio up to a level of about 80% in comparison with the NTSC standard by increasing color purity of a color filter. Moreover, according to the present invention, the LCD module is capable of improving the color representation ratio up to a level of about 80% in comparison with the NTSC standard by arranging the white LEDs 432a, the yellow LEDs 432b, the cyan LEDs 432c, and the magenta LEDs 432d in a direct below-type back light unit to irradiate, the white, yellow, cyan, and magenta colored lights onto the LCD panel 306 (in FIG. 21). Furthermore, the display quality of the LCD module may be improved by increasing the brightness of the LCD panel 406 (in FIG. 23).

Figure 23:
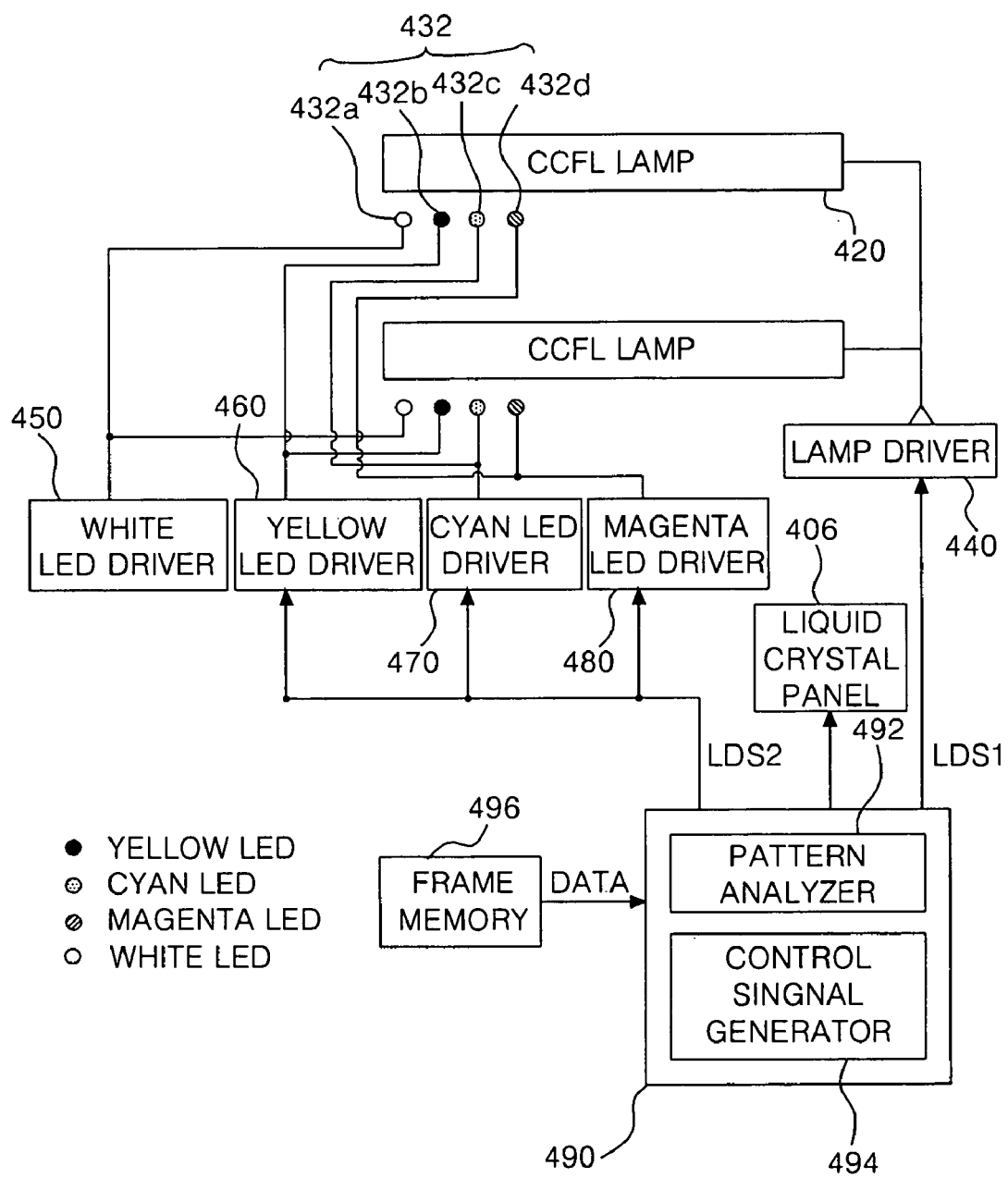
FIG. 23 is a schematic diagram of another exemplary driving apparatus of an LCD module according to the present invention.

FIG. 23 is a schematic diagram of another exemplary driving apparatus of an LCD module according to the present invention. In FIG. 23, a driving apparatus may include a liquid crystal panel 406, a plurality of lamps 420, a plurality of white LEDs 432a to emit white colored light, a plurality of yellow LEDs 432b to emit yellow colored light, a plurality of cyan LEDs 432c to emit cyan colored light, and a plurality of magenta LEDs 432d to emit magenta colored light, a lamp driver 440 to drive the lamps 420; a white LED driver 450 to drive the white LEDs 432a, a yellow LED driver 460 to drive the yellow LEDs 432b, a cyan LED driver 470 to drive the cyan LEDs 432c, a magenta LED driver 480 to drive the magenta LEDs 432d, a frame memory 496 to receive image data from an external source to be stored by frame unit, and a controller 490 to control the LCD panel 406, a lamp driver 440, the white LED driver 450, the yellow LED driver 460, the cyan LED driver 470, and the magenta LED driver 480 in accordance with a result for the image data detected from the image data stored in the frame memory 496.

The LCD panel 406 may display images by using the light emitted from the lamps 420, the white LED 432a, the yellow LED 432b, the cyan LED 432c, and the magenta LED 432d. Detailed explanation the lamps 420, the white LED 432a, the yellow LED 432b, the cyan LED 432c, and the magenta LED 432d may be found above with respect to features shown in FIGS. 9 to 11B.

The controller 490 may include a pattern analyzer 492 receiving the image data stored in the frame memory 496 by a frame unit to detect bright data from the image data, a control signal generator 494 generating a control signal for controlling the lamp driver 440, the white LED driver 450, the yellow LED driver 460, the cyan LED driver 470, and the magenta LED driver 480 in accordance with a result by the pattern analyzer 492. In addition, the controller 490 may supply the image data from the frame memory 496 to the LCD panel 406 to control a driving timing of the LCD panel 406. Further, the controller 490 may generate a lamp driving signal LDS1 for driving the lamps 420 to supply the signal LDS1 to the lamp driver 440, and may generate a LED driving signal LDS2 for driving the white LEDs 432a, the yellow LEDs 432b, the cyan LEDs 432c, and the magenta LEDs 432d to supply the signal LDS2 to the white LED driver 450, the yellow LED driver 460, the cyan LED driver 470, and the magenta LED driver 480.

The pattern analyzer 492 may analyze the image data stored in the frame memory 496 by frame unit to detect bright image data and high color purity image data from the image data. Then, the pattern analyzer 492 may generate a detection signal corresponding to information regarding brightness level, color purity, and location for the detected bright image data and the detected high color purity image data. In response to the detection signal from the pattern analyzer 492, the control signal generator 494 may supply the LED driving signal LDS2 to the detecting signal from the pattern analyzer 492, to the white LED driver 450, the yellow LED driver 460, the cyan LED driver 470, and the magenta LED driver 480. The signal LDS2 may be used to the white LED 432a, the yellow LED 432b, the cyan LED 432c, and the magenta LED 432d associated with the location information for the bright image data and the high color purity image data.

The lamp driver 440 may turn ON the lamps 420 in response to the lamp driving signal LDS1 from the controller 490. For example, the lamp driver 440 may continually turn ON the lamps 420, or may sequentially turn ON the lamps 420 in accordance with a driving method of a scanning back light.

The white LED driver 440, the yellow LED driver 460, the cyan LED driver 470, and the magenta driver 480 may operate the white LEDs 432a, the yellow LEDs 432b, the cyan LEDs 432c, and the magenta LEDs 432d, respectively, associated with the location information for the bright image data and the high color purity image data in response to the LED driving signal LDS2 from the controller 490. Accordingly, the driving apparatus of an LCD module may irradiate white, yellow, cyan, and magenta colored lights emitted from the white LEDs 432a, the yellow LEDs 432b, the cyan LEDs 432c, and the magenta LEDs 432d onto the LCD panel 406, thereby improving the color representation ratio and the brightness of the LCD panel 406.

According to the present invention, a first type of image data among the image data may momentarily increase display brightness within a particular region of the LCD panel 406, as compared to other regions of the LCD panel 406 due to the lamps 420 and the light emitted from the white LEDs 432a. Accordingly, display quality of the LCD module may be improved.

Figure 24:
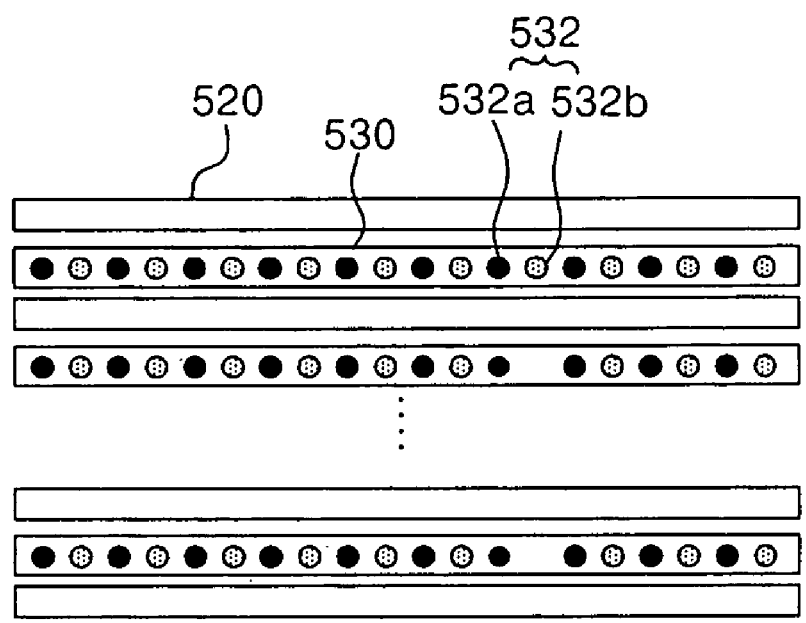
FIG. 24 is a plan view of another exemplary back light unit according to the present invention.

FIG. 24 is a plan view of another exemplary back light unit according to the present invention. In FIG. 24, an LCD module may include a direct-below-type back light unit having a plurality of lamps 520 and a plurality of LED arrays 530 in order to improve color representation ratio and brightness. Each of the LED arrays 530 may include a plurality of yellow LEDs 532a to emit yellow colored light and a plurality of magenta LEDs 532b to emit magenta colored light onto the LCD panel 406 (in FIG. 23).

Figure 25:
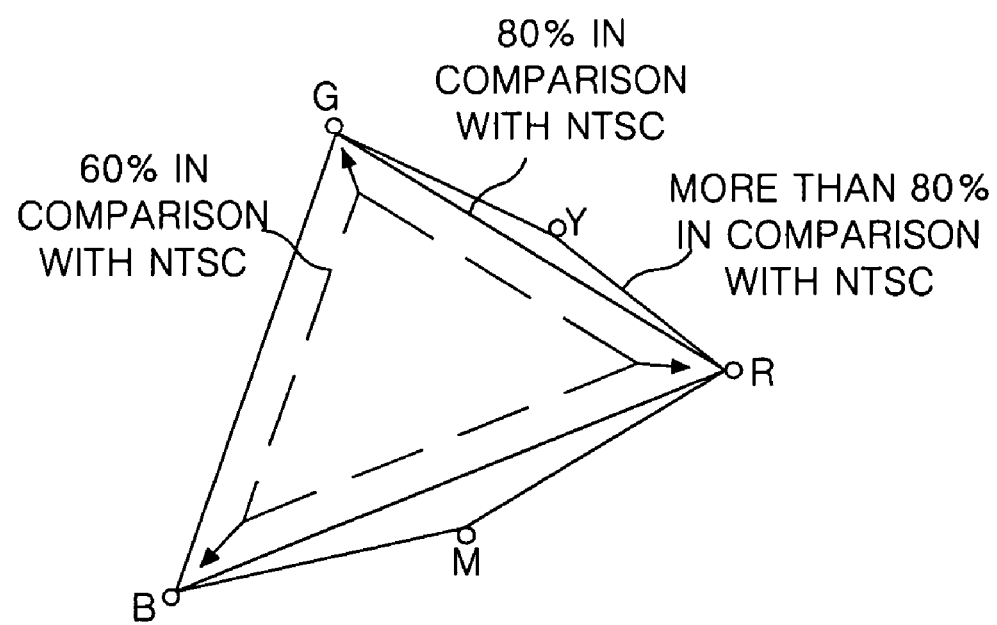
FIG. 25 is a diagram of another exemplary color representation ratio of an LCD module according the present invention.

Accordingly, the LCD module is capable of improving color representation ratio up to a level of about 80% in comparison with the NTSC standard by increasing color purity of a color filter. Moreover, the LCD module is capable of improving the color representation ratio up to a level of about 80% in comparison with the NTSC standard, as shown in FIG. 25, by arranging the yellow LEDs 532a and the magenta LEDs 532b so that the yellow colored light and the magenta colored light may be irradiated onto the LCD panel 506 (in FIG. 26). Furthermore, it is possible to improve the display quality of the LCD module by improving the brightness of the LCD panel 506 (in FIG. 26).

Figure 26:
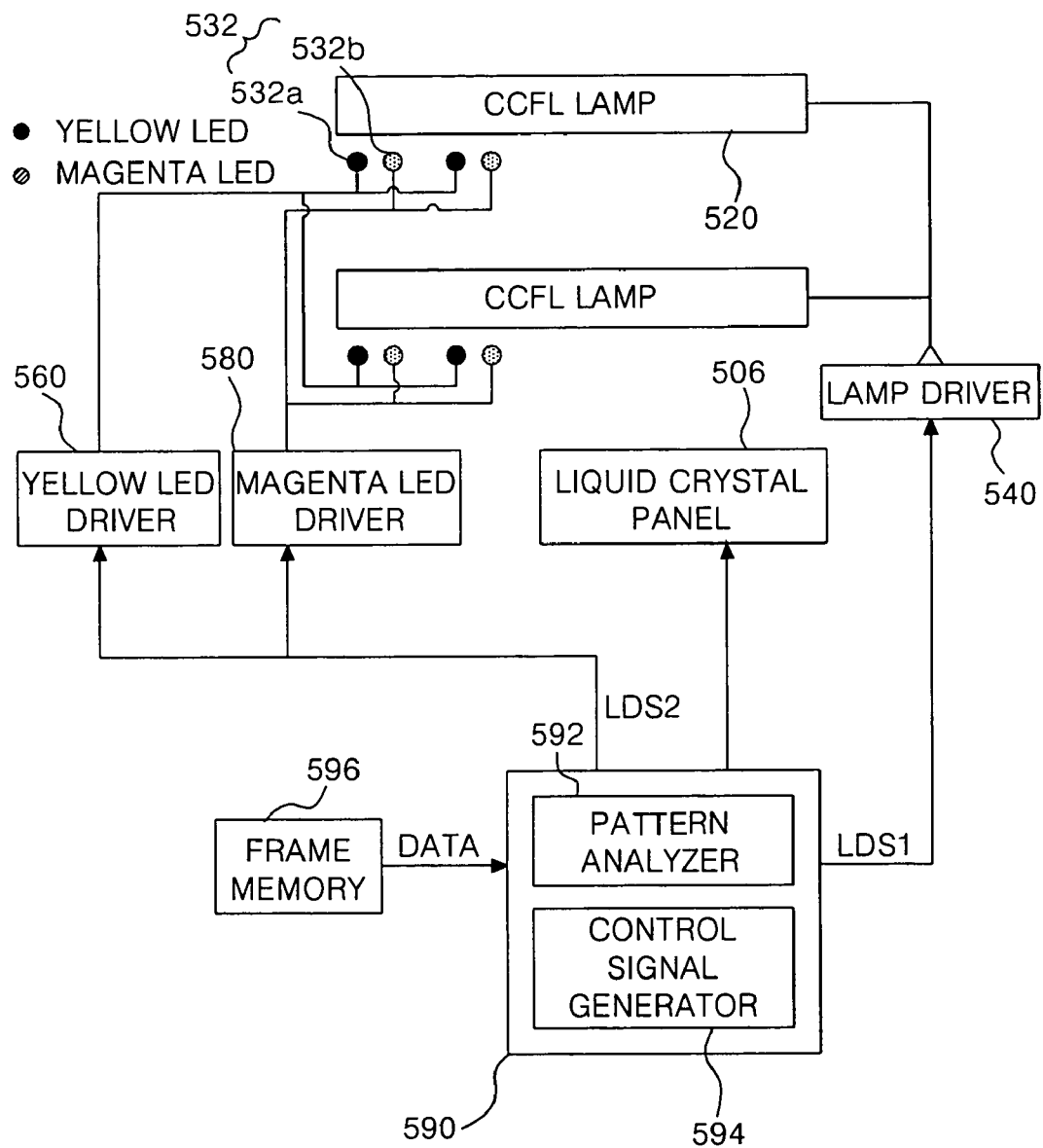
FIG. 26 is a schematic diagram of another exemplary driving apparatus of an LCD module according to the present invention.

FIG. 26 is a schematic diagram of another exemplary driving apparatus of an LCD module according to the present invention. In FIG. 26, a driving apparatus of an LCD module may include an LCD panel 506, a plurality of lamps 520, a plurality of yellow LEDs 532a to emit yellow colored light and a plurality of magenta LEDs 532b to emit magenta colored light, a lamp driver 540 to drive the lamps 520, a yellow LED driver 560 to drive the yellow LEDs 532a, a magenta LED driver 580 to drive the magenta LEDs 532b, a frame memory 596 to receive image data from an external source to be stored by frame unit, and a controller 590 to control the LCD panel 506, a lamp driver 540, the yellow LED driver 560, and the magenta LED driver 580 in accordance with a result for the image data detected from the image data stored in the frame memory 596.

The liquid crystal panel 506 may display images by using the light emitted from the lamps 520, the yellow LEDs 532a, and the magenta LEDs 532b. Detailed explanation the lamps 520, the yellow LEDs 532a, and the magenta LEDs 532b may be found above with respect to features shown in FIGS. 9 to 11B.

The controller 590 may includes a pattern analyzer 592 receiving the image data stored in the frame memory 596 by a frame unit to detect bright data from the image data, a control signal generator 594 generating a control signal for controlling the lamp driver 540, the yellow LED driver 560, and the magenta LED driver 580 in accordance a result analyzed by the pattern analyzer 592. In addition, the controller 590 may supply the image data from the frame memory 596 to the LCD panel 506 to control a driving timing of the LCD panel 506. Furthermore, the controller 590 may generate a lamp driving signal LDS1 for driving the lamps 520 to supply the signal LDS1 to the lamp driver 540, and may generate an LED driving signal LDS2 for driving the yellow LEDs 532a and the magenta LEDs 532b to supply the signal LDS2 to the yellow LED driver 560 and the magenta LED driver 580.

The pattern analyzer 592 may analyze the image data stored in the frame memory 596 by frame unit to detect bright image data and high color purity image data from the image data. Then, the pattern analyzer 592 may generate a detection signal corresponding to information on brightness level, color purity, and location for the detected bright image data and the detected high color purity image data.

In response to the detection signal from the pattern analyzer 592, the control signal generator 594 may supply the LED driving signal LDS2 to the yellow LED driver 560 and the magenta LED driver 580. The signal LDS2 may be used to light-emit the yellow LEDs 532a and the magenta LEDs 532b associated with the location information for the bright image data and the high color purity image data.

The lamp driver 540 may turn ON the lamps 520 in response to the lamp driving signal LDS1 from the controller 590. For example, the lamp driver 540 may continually turn ON the lamps 520, or may sequentially turn ON the lamps 520 in accordance with a driving method of a scanning back light.

The yellow LED driver 560 and the magenta driver 580 may operate the yellow LEDs 532a and the magenta LEDs 532b, respectively, associated with the location information for the bright image data and the high color purity image data image data in response to the LED driving signal LDS2 from the controller 590. Accordingly, the driving apparatus of the LCD module may irradiate yellow and magenta colored light emitted from the yellow LEDs 532a and the magenta LEDs 532b onto the LCD panel 506, thereby improving the color representation ratio and the brightness of the LCD panel 506.

According to the present invention, color representation ratio may be improved by increasing color purity of a color filter layer. Moreover, the LCD module and the driving apparatus according to the present invention may be capable of improving the color representation ratio by arranging at least one LED among the white LEDs, the yellow LEDs, the cyan LEDs, and the magenta LEDs so that the light emitted from the white LEDs, the yellow LEDs, the cyan LEDs, and the magenta LEDs may be irradiated onto the LCD panel 506. Furthermore, the image data may be momentarily brightly displayed on the LCD panel 506 having a peak brightness by using the light from the plurality of LEDs, thereby displaying bright images. Thus, it is possible to improve the display quality of the LCD module.

Although the LEDs in each of the LED arrays according to the present invention may be shown to be aligned with each along a lengthwise direction of the lamps, the LEDs may be offset, or have a staggered configuration. In addition, as shown in FIG. 16, each of the colored LEDs may be offset, or have a staggered configuration along a direction perpendicular to the lengthwise direction of the lamps, wherein adjacent colored LEDs may not necessarily be of the same color. Moreover, as shown in FIG. 19, the LED arrays may be clustered together in groups of LEDs, wherein some of the groups of colored LEDs may alternate along the lengthwise direction of the lamps. Furthermore, as shown in FIG. 16, intervals between adjacent colored LEDs may be different along the lengthwise direction of the lamps.

It will be apparent to those skilled in the art that various modifications and variations can be made in the liquid crystal display module and driving apparatus thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
    a liquid crystal display panel having a color filter layer, the color filter layer having color pixels of red, green, and blue with different wavelength;
    a plurality of lamps for irradiating a first light onto the liquid crystal display panel;
    a plurality of light emitting diode arrays, each including a printed circuit board (PCB) and a plurality of light emitting diodes arranged on the PCB and between the lamps to irradiate a second light onto the liquid crystal display panel, wherein the light emitting diodes include a plurality of yellow light emitting diodes and a plurality of magenta light emitting diodes to increase a brightness of the liquid crystal display panel;
    a housing receiving the lamps and the light emitting diode arrays; and
    a diffuser on the lamps and the light emitting diode arrays to diffuse the first and second light,
    wherein the liquid crystal display panel is disposed on the diffuser,
    wherein each color pixel includes a single layer that transmits a wavelength for a specific color in the first and second light with a transmission wavelength band of less than about 30 nm,
    wherein the PCB is directly mounted on the housing in parallel to a lengthwise direction of the lamps, and
    wherein an interval between the light emitting diodes at an edge region of the light emitting array along a lengthwise direction of the lamp is different from and larger than intervals between remaining light emitting diodes of the light emitting array.

2. The liquid crystal display module according to claim 1, wherein the light emitting diodes further include a plurality of white light emitting diodes.

3. The liquid crystal display module according to claim 2, wherein the light emitting diodes further include a plurality of cyan light emitting diodes.

4. The liquid crystal display module according to claim 3, wherein each of the yellow light emitting diodes, each of the cyan light emitting diodes, each of the magenta light emitting diodes, and each of the white light emitting diodes are alternately arranged with each other.

5. The liquid crystal display module according to claim 1, wherein the light emitting diodes further include a plurality of cyan light emitting diodes.

6. The liquid crystal display module according to claim 5, wherein each of the yellow light emitting diodes, each of the cyan light emitting diodes, and each of the magenta light emitting diodes are alternately arranged with each other.

7. The liquid crystal display module according to claim 1, wherein each of the yellow light emitting diodes and each of the magenta light emitting diodes are alternately arranged with each other along a lengthwise direction of the plurality of lamps.

8. The liquid crystal display module according to claim 1, wherein at least two lamps are disposed between the light emitting diode arrays, and at least two adjacent light emitting diodes having the same color light are disposed along a lengthwise direction of the lamp.

9. A liquid crystal display module, comprising:
a liquid crystal display panel having a color filter layer, the color filter layer having color pixels of red, green, and blue with different wavelength corresponding to pixel regions for displaying an image;
a plurality of lamps for irradiating a first light onto the liquid crystal display panel;
a plurality of light emitting diode arrays, each including a printed circuit board (PCB) and a plurality of light emitting diodes arranged on the PCB and between the lamps to irradiate a second light onto the liquid crystal display panel, wherein the light emitting diodes include a plurality of yellow light emitting diodes and a plurality of cyan light emitting diodes to increase a brightness of the liquid crystal display panel;
a housing receiving the lamps and the light emitting diode arrays; and
a diffuser on the lamps and the light emitting diode arrays to diffuse the first and second light,
wherein the liquid crystal display panel is disposed on the diffuser,
wherein each color pixel includes a single layer that transmits a wavelength for a specific color in the first and second light with a transmission wavelength width of less than about 30 nm,
wherein the PCB is directly mounted on the housing in parallel to a lengthwise direction of the lamps, and
wherein an interval between the light emitting diodes at an edge region of the light emitting array along a lengthwise direction of the lamp is different from and larger than intervals between remaining light emitting diodes of the light emitting array.

10. The liquid crystal display module according to claim 9, wherein each of the yellow light emitting diodes and each of the cyan light emitting diodes are alternately arranged with each other along a lengthwise direction of the plurality of lamps.

11. The liquid crystal display module according to claim 9, wherein the light emitting diodes further include a plurality of white light emitting diodes.

12. The liquid crystal display module according to claim 11, wherein each of the yellow light emitting diodes, each of the cyan light emitting diodes, and each of the white light emitting diodes are alternately arranged with each other.

13. A liquid crystal display module, comprising:
a liquid crystal display panel having a color filter layer, the color filter layer having color pixels of red, green, and blue with different wavelength;
a plurality of lamps for irradiating a first light onto the liquid crystal display panel;
a plurality of light emitting diode arrays, each including a printed circuit board (PCB) and a plurality of light emitting diodes arranged on the PCB and between the lamps to irradiate a second light onto the liquid crystal display panel, wherein the light emitting diodes includes at least one of a plurality of yellow light emitting diodes, a plurality of magenta light emitting diodes and a plurality of cyan light emitting diodes to increase a brightness of the liquid crystal display panel;
a housing receiving the lamps and the light emitting diode arrays; and
a diffuser on the lamps and the light emitting diode arrays to diffuse the first and second light,
wherein the liquid crystal display panel is disposed on the diffuser,
wherein each color pixel includes a single layer that transmits a wavelength for a specific color in the first and second light with a transmission wavelength band of less than about 30 nm,
wherein the PCB is directly mounted on the housing in parallel to a lengthwise direction of the lamps, and
wherein an interval between the light emitting diodes at an edge region of the light emitting array along a lengthwise direction of the lamp is different from and larger than intervals between remaining light emitting diodes of the light emitting array.

14. The liquid crystal display module according to claim 13, wherein the liquid crystal display panel converts the first light generated from the back light unit into a plurality of colored lights.

15. The liquid crystal display module according to claim 13, wherein the light emitting diodes further includes a plurality of white light emitting diodes.

16. The liquid crystal display module according to claim 13, wherein the light emitting diodes include a plurality of yellow light emitting diodes and a plurality of cyan light emitting diodes.

17. The liquid crystal display module according to claim 16, wherein each of the yellow light emitting diodes and each of the cyan light emitting diodes are alternately arranged with each other along a lengthwise direction of the plurality of lamps.

18. The liquid crystal display module according to claim 13, wherein the light emitting diodes include a plurality of yellow light emitting diodes and a plurality of magenta light emitting diodes.

19. The liquid crystal display module according to claim 18, wherein each of the yellow light emitting diodes and each of the magenta light emitting diodes are alternately arranged with each other.

20. The liquid crystal display module according to claim 13, wherein the light emitting diodes include a plurality of yellow light emitting diodes, a plurality of cyan light emitting diodes, and a plurality of magenta light emitting diodes.

21. The liquid crystal display module according to claim 20, wherein each of the yellow light emitting diodes, each of the cyan light emitting diodes, and each of the magenta light emitting diodes are alternately arranged with each other.

22. The liquid crystal display module according to claim 13, wherein the light emitting diodes include a plurality of yellow light emitting diodes, a plurality of cyan light emitting diodes, a plurality of magenta light emitting diodes, and a plurality of white light emitting diodes.

23. The liquid crystal display module according to claim 22, wherein each of the yellow light emitting diodes, each of the cyan light emitting diodes, each of the magenta light emitting diodes, and each of the white light emitting diodes are alternately arranged with each other.

* * * * *